United States Patent [19]
Yagi

[11] Patent Number: 5,403,247
[45] Date of Patent: Apr. 4, 1995

[54] RETURN THROTTLE MEANS OF TRACTION CONTROL APPARATUS WITH TRACTION CONTROL FOR INHIBIT MEANS WHENEVER A SHIFT SIGNAL IS ISSUED FOR AUTOMOTIVE VEHICLE EQUIPPED WITH AUTOMATIC TRANSMISSION

[75] Inventor: Yoshifumi Yagi, Okazaki, Japan

[73] Assignee: Toyota Jidosha Kabushiki Kaisha, Toyota, Japan

[21] Appl. No.: 12,201

[22] Filed: Feb. 2, 1993

[30] Foreign Application Priority Data

Feb. 7, 1992 [JP] Japan ............................ 4-022930

[51] Int. Cl.$^6$ ...................... B60K 31/00; F02D 29/02; F02D 41/04
[52] U.S. Cl. ........................... 477/107; 477/110; 180/197; 364/426.03
[58] Field of Search ............... 477/109, 110, 107; 364/426.02, 426.03; 180/197

[56] References Cited

U.S. PATENT DOCUMENTS

| | | | |
|---|---|---|---|
| 5,047,940 | 9/1991 | Onaka et al. | 180/197 X |
| 5,070,960 | 12/1991 | Nobumoto et al. | 364/426.02 X |
| 5,107,948 | 4/1992 | Yamamoto | 180/197 |
| 5,151,861 | 9/1992 | Danno et al. | 364/426.02 |
| 5,243,526 | 9/1993 | Ito et al. | 364/426.03 X |
| 5,262,952 | 11/1993 | Tsuyama et al. | 364/426.03 |

FOREIGN PATENT DOCUMENTS

| | | |
|---|---|---|
| 349993 | 1/1990 | European Pat. Off. |
| 386792 | 9/1990 | European Pat. Off. |
| 393669 | 10/1990 | European Pat. Off. |
| 3927349 | 2/1990 | Germany |
| 63-113131A | 5/1988 | Japan |
| 1247726A | 10/1989 | Japan |
| 3172549A | 7/1991 | Japan |

*Primary Examiner*—Dirk Wright
*Assistant Examiner*—Khoi Q. Ta
*Attorney, Agent, or Firm*—Kenyon & Kenyon

[57] ABSTRACT

A traction control apparatus for an automotive vehicle with an automatic transmission includes a first sensing part for outputting a shift signal indicating a shifting condition of the automatic transmission, a second sensing part for outputting an engine speed signal indicating an engine speed of an engine of the vehicle, a traction control part for carrying out a traction control process for controlling slipping of driving wheels of the vehicle by adjusting an engine torque based on the shift signal, and for performing, when a shifting request occurs, a shifting process in which the engine torque is decreased in preference to the traction control process, and a return torque setting part for setting a return position of a throttle valve of the engine at an end of the shifting process, the setting being based on the engine speed signal output at a time of a shifting started in the automatic transmission and based on a gear ratio associated with the shifting, the traction control part performs the traction control process at the end of the shifting process in accordance with the return torque set by the return torque setting part.

10 Claims, 15 Drawing Sheets

RETURN THROTTLE MEANS OF TRACTION CONTROL APPARATUS WITH TRACTION CONTROL FOR INHIBIT MEANS WHENEVER A SHIFT SIGNAL IS ISSUED FOR AUTOMOTIVE VEHICLE EQUIPPED WITH AUTOMATIC TRANSMISSION

BACKGROUND OF THE INVENTION

1. Field of the Invention

The present invention generally relates to a traction control apparatus, and more particularly to a traction control apparatus for an automotive vehicle equipped with an automatic transmission, in which an improved traction control process is performed with an appropriate return torque when a shifting of the automatic transmission occurs.

2. Description of the Related Art

A traction control system for use in automotive vehicles with automatic transmissions is known. In an automotive vehicle equipped with an automatic transmission, a traction control process is performed by the traction control system to prevent the driving wheels of the vehicle from undergoing excessive slippage when the vehicle starts moving or when it is accelerated. By performing the traction control by means of the traction control system, vehicle acceleration and straight line stability are improved when the vehicle is in such operating conditions.

In the above mentioned traction control system, a target rotational speed is predetermined for each of the driving wheels. A slipping amount is defined to be a speed difference between the predetermined target rotational speed and the actual speed of the driving wheels of the vehicle. In the traction control system, a feedback control process for the driving torque is performed so as to maintain the slipping amount mentioned above at a value smaller than a predetermined value. In this specification, the feedback control process for maintaining to maintain the above mentioned slipping amount at a value smaller than a predetermined value is hereinafter called the traction control process.

In the above mentioned traction control system, if a shift-up action of the automatic transmission occurs when the traction control process is being performed, the throttle valve is closed to cause the position of the throttle valve to change to a smaller opening position. Thus, the engine speed is lowered so as to prevent an overload of the engine at this time. If no measure is taken at this time, the engine speed is increased excessively since no driving torque from the engine is transmitted to the driving wheels via the automatic transmission during the shift-up action. When the shift-up action of the automatic transmission ends, the engine speed is increased and the traction control process is returned to the normal condition thereof.

Japanese Laid-Open Patent Publication No. 1-247726 discloses an automotive vehicle traction control method of the type described above. In the traction control method disclosed in this publication, when a shift-up action of the automatic transmission occurs during a traction control process, the throttle valve is closed to lower the engine speed. After the shift-up action is completed, the throttle valve is opened to increase the engine speed so that the traction control process is returned to the normal operation thereof. A return position of the throttle valve by which the traction control process is returned to the normal operation thereof is determined based on the position of the throttle valve before the shift-up action occurs and based on the gear position of the automatic transmission after the shift-up action occurs.

However, the position of the throttle valve before the shift-up action occurs may be an inappropriate position due to external conditions such as: a fuel cut condition, an ignition timing retarded condition, or a local riding transfer slip. In the above mentioned traction control method, there is a problem in that the return position of the throttle valve may be determined based on an inappropriate position of the throttle valve before the shift-up action occurs. If an inappropriate position of the throttle valve is used it is impossible to set the return position of the throttle valve to the position at which an optimal traction control process suitable for the current road conditions and the engine operating conditions is performed.

SUMMARY OF THE INVENTION

Accordingly, it is a general object of the present invention to provide an improved traction control apparatus in which the above described problems are eliminated.

Another, more specific object of the present invention is to provide a traction control apparatus in which the return torque of the engine at the end of a shifting process is determined based on an engine speed at the start of the shifting in the automatic transmission and is also based on a gear ratio associated with the shifting, so that a traction control process executed at the end of the shifting process is performed with an appropriate return torque, thereby the traction control process is optimized for the current road conditions and engine operating conditions. The above mentioned object of the present invention is achieved by a traction control apparatus which includes a first sensing part for outputting a shift signal indicating a shifting condition of the automatic transmission of the vehicle, a second sensing part for outputting an engine speed signal indicating an engine speed of an engine of the vehicle, a traction control part for carrying out a traction control process for controlling slipping of driving wheels of the vehicle by adjusting an engine torque based on the shift signal from the first sensing part, and for performing, when a shifting request occurs in a transmission control unit, a shifting process in which the engine torque is decreased in preference to the traction control process, and a return torque setting part for setting a return position of a throttle valve in the engine at an end of the shifting process of the traction control part. The setting is based on the engine speed signal, output by the second sensing part at a time of a shifting started in the automatic transmission, and is based on a gear ratio associated with the shifting, wherein the traction control part performs the traction control process at the end of the shifting process in accordance with the return torque from the return torque setting part.

According to the present invention, it is possible to reliably obtain an appropriate return position of a throttle valve so that the traction control process at the end of the shifting process is performed without making the traction control process inconsistent with the road condition or the engine operating condition. The traction control apparatus of the present invention is advantageous in that the optimal return torque of the engine can be obtained, in contrast to the above mentioned conventional apparatus wherein the return position of the throttle valve, which sets the return torque of the engine, is determined based on the throttle valve position before the shifting of the automatic transmission.

Other objects and further features of the present invention will become more apparent from the following detailed description when read in conjunction with the accompanying drawings.

DESCRIPTION OF THE PREFERRED EMBODIMENT

First, a description will be given of a construction of a traction control apparatus according to the present invention, with reference to FIG. 1.

Figure 1:
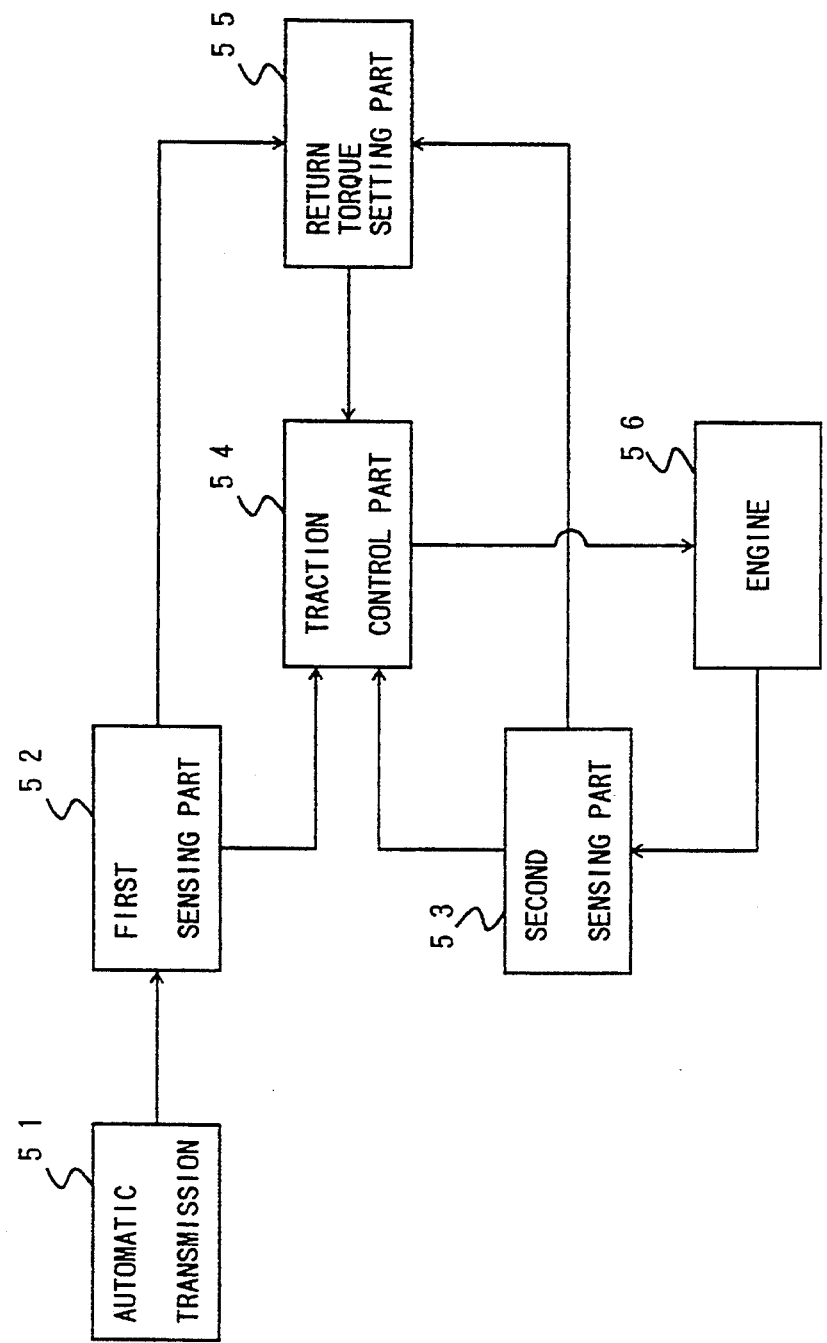
FIG. 1 is a block diagram showing a traction control apparatus according to the present invention.

FIG. 1 shows a traction control apparatus for an automotive vehicle equipped with an automatic transmission according to the present invention. In FIG. 1, the traction control apparatus includes a first sensing part 52 for outputting a shift signal indicating a shifting condition of an automatic transmission 51 of the vehicle. The traction control apparatus also includes a second sensing part 53 for outputting an engine speed signal indicating an engine speed of an engine 56 of the vehicle, a traction control part 54, and a return torque setting part 55. The traction control part 54 carries out a traction control process for controlling slipping of driving wheels of the vehicle by increasing or decreasing an engine torque based on the shift signal from the first sensing part 52 and the engine speed signal from the second sensing part 53. When a shifting of the automatic transmission 51 occurs during the traction control process, a shifting process in which the engine torque is decreased in preference to the traction control process is performed.

In the return torque setting part 55 of the traction control apparatus shown in FIG. 1, a return torque of the engine (corresponding to a return position of a sub throttle valve described below) at the end of the shifting process of the traction control part 54 is determined based on an engine speed at the start of the actual shifting in the automatic transmission and also based on a gear ratio associated with the shifting. Thus, in the traction control part 54, the traction control process at the end of the shifting process is performed in accordance with such a return torque from the return torque setting part 55.

Figure 2:
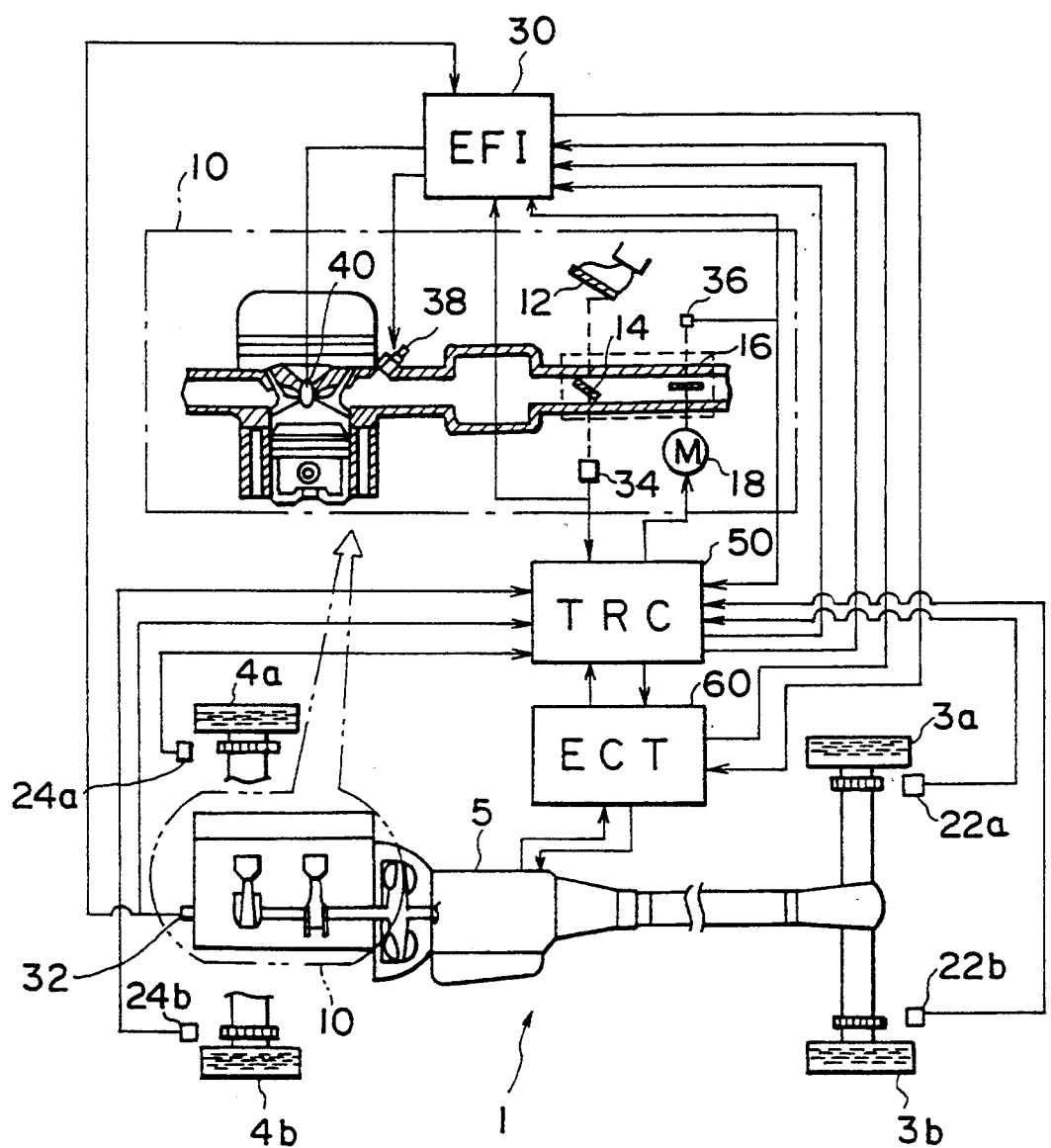
FIG. 2 is a diagram showing an automotive vehicle to which a preferred embodiment of the traction control apparatus according to the present invention is applied.

Next, a description will be given, with reference to FIG. 2, of a preferred embodiment of the traction control apparatus according to the present invention. FIG. 2 shows an automotive vehicle 1 in which the traction control apparatus according to the present invention is mounted. As shown in FIG. 2, the automotive vehicle 1 has an engine 10, an automatic transmission 5, driving wheels 3a and 3b, and driven wheels 4a and 4b. The driving wheels are rotated by a driving force transmitted by the engine 1 via the transmission 5. In the wheels 3a, 3b, 4a and 4b, vehicle speed sensors 22a, 22b, 24a and 24b are respectively mounted so as to sense a rotational speed of each of the four wheels of the vehicle 1.

In an intake passage of the engine 10 shown in FIG. 2, a main throttle valve 14 and a sub throttle valve 16 upstream from the main throttle valve 14 are provided. The main throttle valve 14 controls a flow of air in the intake passage of the engine 10 in response to a position of an accelerator pedal 12 operated by a vehicle operator. Independently from the operation of the main throttle valve 14, the sub throttle valve 16 is operated by an actuator such as a stepper motor 18. An engine speed sensor 32 is mounted on the engine 10 so as to sense a speed of the engine 10 and outputs a signal indicating the engine speed (e.g., revolutions per minute). A main throttle position sensor 34 is mounted so as to sense a position of the main throttle valve 14 and outputs a signal indicating the position of the main throttle valve 14. A sub throttle position sensor 36 is mounted so as to sense a position of the sub throttle valve 16 and outputs a signal indicating the position of the sub throttle valve 16.

In the engine 10 shown in FIG. 2, an electronic fuel injection control unit (EFI unit) 30 is provided. The EFI unit 30 uses a digital computer to perform a fuel injection control process for a fuel injection valve 38 of the engine 10 and to perform an ignition timing control process for a spark plug 40 of a combustion chamber thereof.

The engine speed signal from the engine speed sensor 32, the throttle position signal from the main throttle position sensor 34, the throttle position signal from the sub throttle position sensor 36, and other signals from other sensors are input to the EFI unit 30. The EFI unit 30 controls the fuel injection and the ignition timing in accordance with these input signals, as described above. The EFI unit 30 is connected to the fuel injection valve 38 and to the spark plug 40 of the engine 10, and outputs control signals, respectively, to the fuel injection valve 40 and to the spark plug 38 in accordance with the results of the above described control processes of the fuel injection and the ignition timing.

In the vehicle 1 shown in FIG. 2, a traction control unit (TRC unit) 50 is provided. The TRC unit 50 uses a digital computer to perform a traction control process for the vehicle 1. The rotational speed signals of the four wheels 3a, 3b, 4a and 4b from the wheel speed sensors 22a, 22b, 24a and 24b, the engine speed signal from the engine speed sensor 32, and the throttle position signals of the main and sub throttle valves 14 and 16 from the throttle position sensors 34 and 36 are input to the TRC unit 50. The TRC unit 50 performs the traction control process in accordance with these input signals. Specifically, the TRC unit 50 controls the throttle position of the sub throttle valve 16. The TRC unit 50 is connected to the EFI unit 30 so that a fuel cut signal and an ignition timing retard signal are output from the TRC unit 50 to the EFI unit 30.

In the above mentioned embodiment shown in FIG.2, the driving torque of the engine 10, during the traction control process, is controlled by setting a throttle position of the sub throttle valve 16 to an appropriate position in accordance with the slipping condition of the driving wheels. In the above described embodiment shown in FIG. 2, the throttle position Ts of the sub throttle valve 16 is set in accordance with the slipping amount dV of the driving wheels 3a and 3b, as follows.

$$Ts(n) = Ts(n-1) + (dTs/dt) \cdot To \quad (1)$$

$$(dTs/dt) = K1 \cdot dV + K2 \cdot K3 \cdot dG \quad (2)$$

In the formula (1) above, $Ts(n)$ denotes the current position of the sub throttle valve 16, $Ts(n-1)$ denotes the previously set position of the sub throttle valve 16, and To denotes the time period for which the setting operation is performed. In the formula (2) above, K1, K2 and K3 are coefficients with a positive value, dV is a speed difference ($=Vs-Vd$) between the target driven wheel speed Vs (which is determined based on the vehicle speed Vr) and the actual driven wheel speed Vd, and dG is a difference (the absolute value) between the changing rate of vehicle speed Vr and the changing rate of driven wheel speed Vd [i.e., $dG = (dVr/dt) - (dVd/dt)$].

In the vehicle 1 shown in FIG. 2, an electronic controlled transmission unit (ECT unit) 60 is provided. The ECT unit 60 uses a digital computer to control the shifting condition of the automatic transmission 5 in accordance with a throttle position signal from the main throttle position sensor 36 and a vehicle speed signal from a vehicle speed sensor (not shown). By the control operation of the ECT unit 60, the shifting condition of the automatic transmission 5 is controlled so as to be appropriate for the current vehicle running conditions. The EFI unit 30, the TRC unit 50, and the ECT unit 60, as shown in FIG.2, are interconnected so that necessary signals for the respective control processes are transmitted between and received by the three units.

Next, a description will be given of the traction control process performed by the TRC unit 50 of the traction control apparatus of the present invention.

Figure 3A:
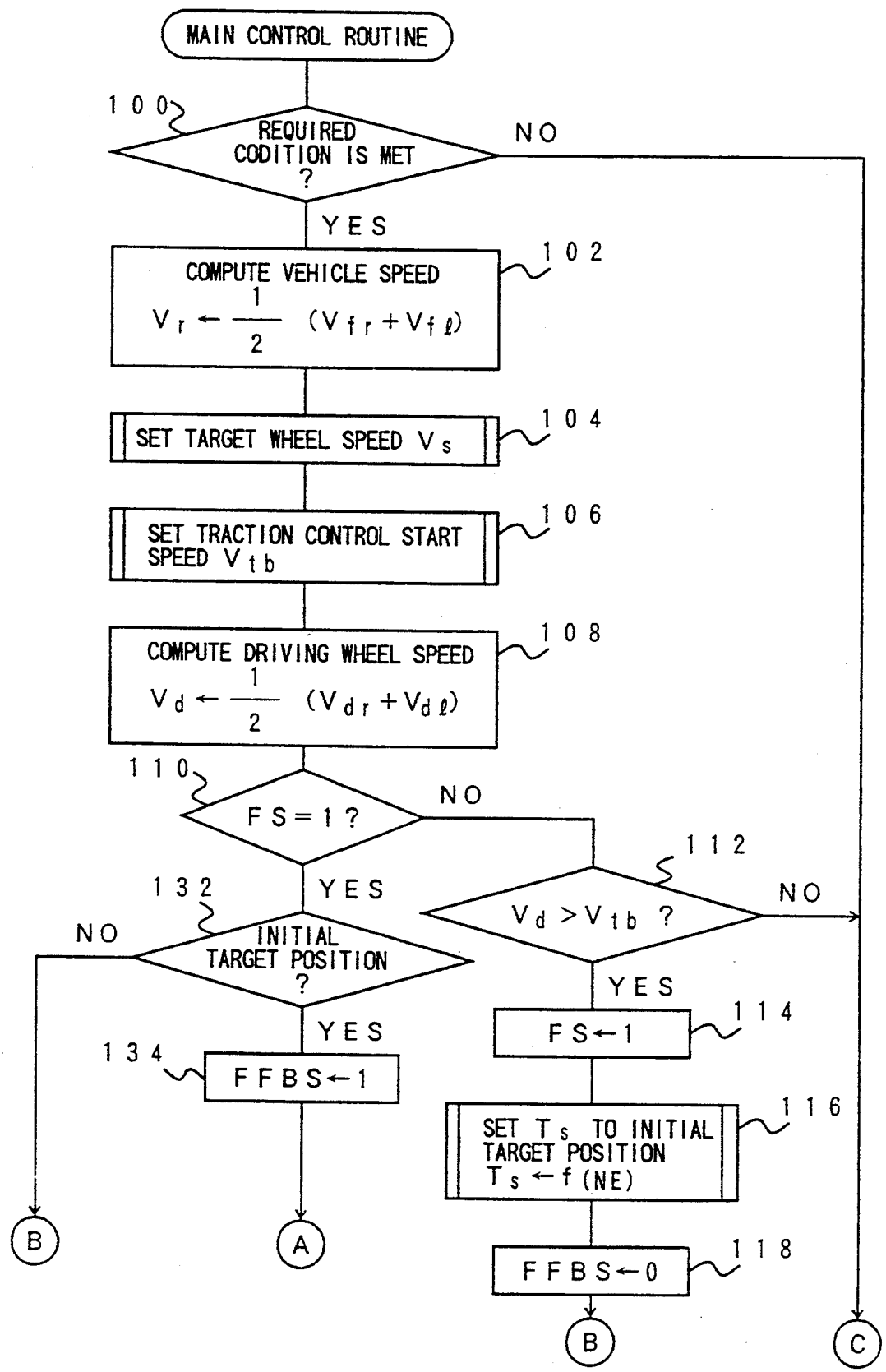
FIGS. 3A and 3B are flow charts for explaining a main routine of a traction control process performed by the traction control apparatus of the present invention.
Figure 3B:
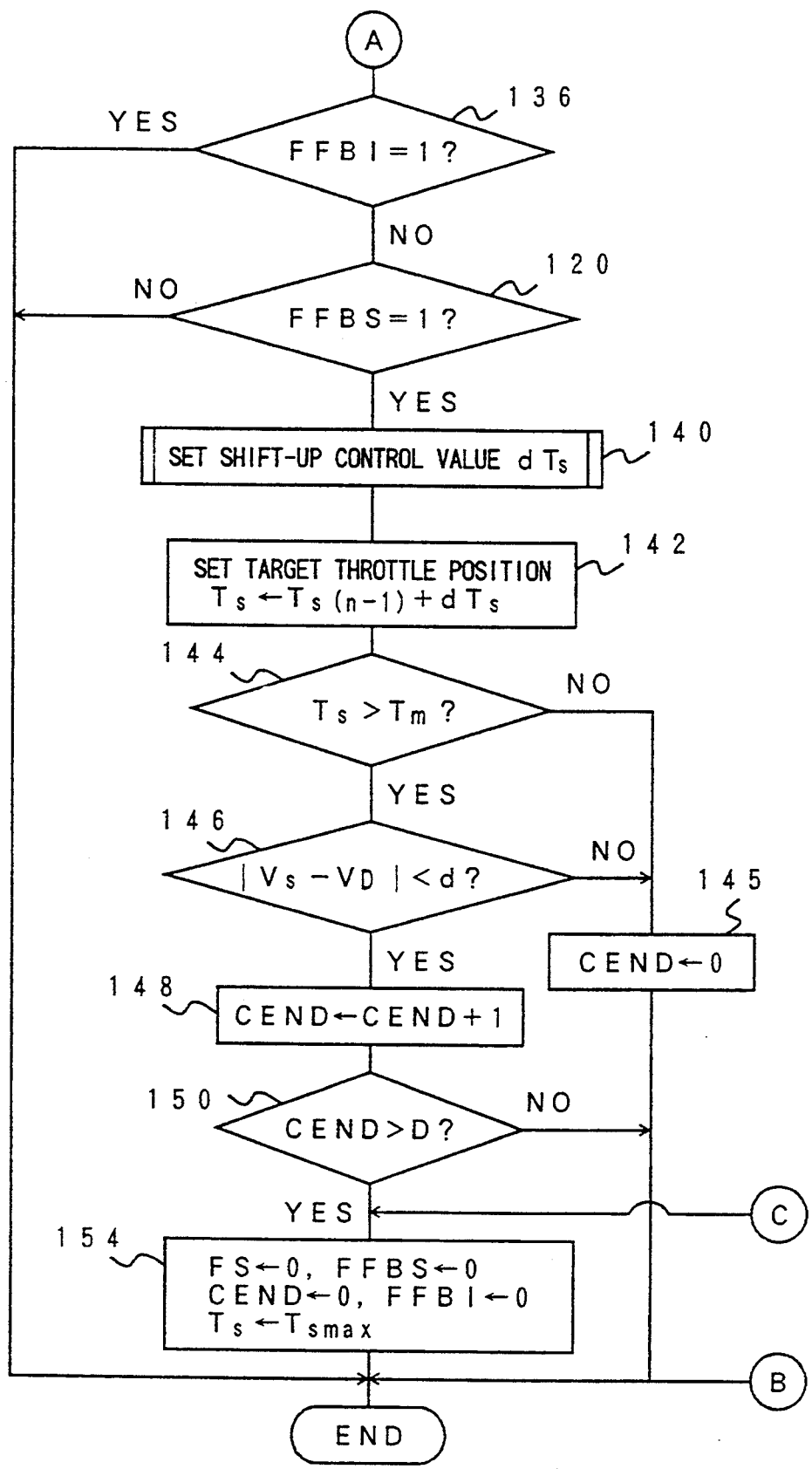

FIGS. 3A and 3B show a main routine of the traction control process performed by the TRC unit 50 described above. This main routine is periodically performed at prescribed time intervals (e.g., every 12 msec). Step 100 shown in FIG. 3A detects whether or not the conditions required for starting the traction control process are satisfied. The required conditions include: 1) the main throttle valve 14 does not lie at its fully closed position, and 2) no malfunction occurs in any of the above mentioned sensors. If either of the required conditions is not satisfied, the next step 154 in FIG. 3B is performed and the routine ends. In step 154, all the flags are reset to zero and the position Ts of the sub throttle valve is set to a maximum opening position Tsmax. This Tsmax is the fully open position of the sub throttle valve 16.

If the required conditions are satisfied in step 100, the speed parameters from the sensors are read out and the associated calculations thereof are performed in steps 102–108. Step 102 computes a vehicle speed Vr by taking the average of the speeds Vfr and Vfl of the right-hand and left-hand driven wheels output by the sensors 24a and 24b. Step 104 sets a target speed Vs of the driving wheels by using the vehicle speed Vr in step 102.

The target speed Vs of the driving wheels is set in step 104 as follows.

1) If $Vr \leq 30$ Km/h, $Vs = (Vr + 2.4)$ Km/h.
2) If $30$ Km/h $< Vr \leq 100$ Km/h, $Vs = (1.08 Vr)$ Km/h.
3) If $Vr > 100$ Km/h, Vs is set to the smaller one of 1.08 Vr Km/h and $(Vr + 10)$ Km/h. The target speed Vs is set in step 104 such that it is always greater than the vehicle speed Vr and that the driving wheels have a prescribed slipping amount. It is readily understood from the above formulas 1) to 3) that, when the vehicle speed Vr is low, the value of the target slipping ratio $(Vs-Vr)/Vr$ is relatively large so as to ensure increased vehicle acceleration, and that when the vehicle speed Vr is high the value of the target slipping ratio is relatively small to ensure increased straight line stability of the vehicle.

Step 106 sets the start speed Vtb at which the traction control process is started. The start speed is represented by the formula: $Vtb = Vs + C$, where C is a constant. The constant C is preset to a value between 2.0 Km/h and 4.0 Km/h. In other words, the start speed Vtb is set to a value greater than the target speed Vs by the preset constant C, in order to prevent the traction control process from being excessively performed frequently. Step 108 computes a speed Vd of the driving wheels by taking the average of the speeds Vdr and Vdl of the right-hand and left-hand driving wheels output by the sensors 22a and 22b.

After the setting of the speed parameters is completed, step 110 detects whether or not a traction control start flag FS is equal to 1. If the traction control start flag FS=0, it is judged that the traction control process has not yet been started. If the traction control start flag FS=1, it is judged that the traction control process has been started.

When the flag FS is not equal to 1, the next step 112 is performed. In step 112, it is judged whether or not it is necessary to start the traction control process. More specifically, step 112 detects whether or not the driving wheel speed Vd is greater than the traction control start speed Vtb. If $Vd \leq Vtb$, it is judged that it is not necessary to start the traction control process, and the next step 154 is performed and the routine ends. As described above, in step 154, all the flags are reset to zero and the position Ts of the sub throttle valve 16 is set to the maximum opening position Tsmax.

If $Vd > Vtb$ in step 112, it is judged that it is necessary to start the traction control process. Step 114 sets the traction control start flag FS to 1. Step 116 sets the position Ts of the sub throttle valve 16 to an initial target position f(Ne). Step 118 resets an initial feedback control prohibition flag FFBS to zero. Then, the main routine ends. The initial target position f(Ne) of the sub throttle valve 16 is a value determined depending on the engine speed Ne and the road condition. Usually, when the traction control process is not performed, the sub throttle valve 16 is set at the fully open position, and if the feedback control process is started at this condition it takes a certain time until the sensitivity to a change of the position of the sub throttle valve 16 appears. In order to eliminate this time, in step 116 the position Ts of the sub throttle valve 16 is set to the initial target position f(Ne). The initial feedback control prohibition flag FFBS is set to 1 when a prescribed requirement is satisfied after the traction control process is started.

If the above steps 112 to 118 are previously performed, step 110 detects that the flag FS is equal to 1. The next step 132 is performed. In step 132, it is detected whether or not the position Ts of the sub throttle valve 16 indicated by the output signal of the sub throttle position sensor 36 has reached the initial target position f(Ne). If the initial target position f(Ne) is not reached, the main routine ends. If the initial target position f(Ne) is reached, the next step 134 is performed. Step 134 sets the initial feedback control prohibition flag FFBS to 1.

Step 136, shown in FIG. 3B, detects whether or not a feedback prohibition flag FFBI is equal to 1. If the flag FFBI is equal to 1, the main routine ends. If the flag FFBI is not equal to 1, the feedback control process for setting the target position Ts of the sub throttle valve 16 is performed in the subsequent steps 120 to 154.

Step 120 detects whether or not the flag FFBS is equal to 1. If the flag FFBS is not equal to 1, the main routine ends without performing steps 140 to 154. If the flag FFBS is equal to 1, the feedback control process for setting the position Ts of the sub throttle valve 16 is performed in steps 140 to 154. In step 140, a shift-up control value dTs for obtaining the target position Ts of the sub throttle valve 16 is determined. This procedure will be described below with reference to FIG. 9.

Step 142 sets the target position Ts of the sub throttle valve 16 based on the previous position Ts(n−1) of the sub throttle valve 16 and the control value dTs, according to the formula: Ts=Ts(n−1)+dTs. A signal indicating the target position Ts in step 142 is output to the stepper motor 18 for driving the sub throttle valve 16 shown in FIG. 2.

The traction control process is completed only when the following conditions continue for more than a prescribed time period: (1) the position Ts of the sub throttle valve 16 is greater than the position Tm of the main throttle valve 14, and (2) the absolute value of the slipping amount (Vs–Vd) is greater than a prescribed value. In steps 144 to 154, the discrimination for the above mentioned conditions is performed.

Step 144 detects whether or not the position Ts of the sub throttle valve 16 is greater than the position Tm of the main throttle valve 14. Step 146 detects whether or not the absolute value of the slipping amount (Vs–Vd) is greater than a prescribed value d. If either of the conditions in steps 144 and 146 is not satisfied, step 145 reset a time count CEND to zero, and the main routine ends. If both the conditions in steps 144 and 146 are satisfied, step 148 increments the time count CEND. Step 150 detects whether or not the time count CEND is greater than a prescribed time D. If the time count CEND is greater than the prescribed time D in step 150, it is judged that the traction control end conditions are satisfied. The prescribed value d and the prescribed time D are suitably preset according to the type of the vehicle to which the traction control apparatus according to the present invention is applied. In step 154, all the flags FS, FFBS, CEND, and FFBI are reset to zero, and the target position Ts of the sub throttle valve 16 is set to the maximum open position Tsmax. Then, the main routine ends.

Figure 7:
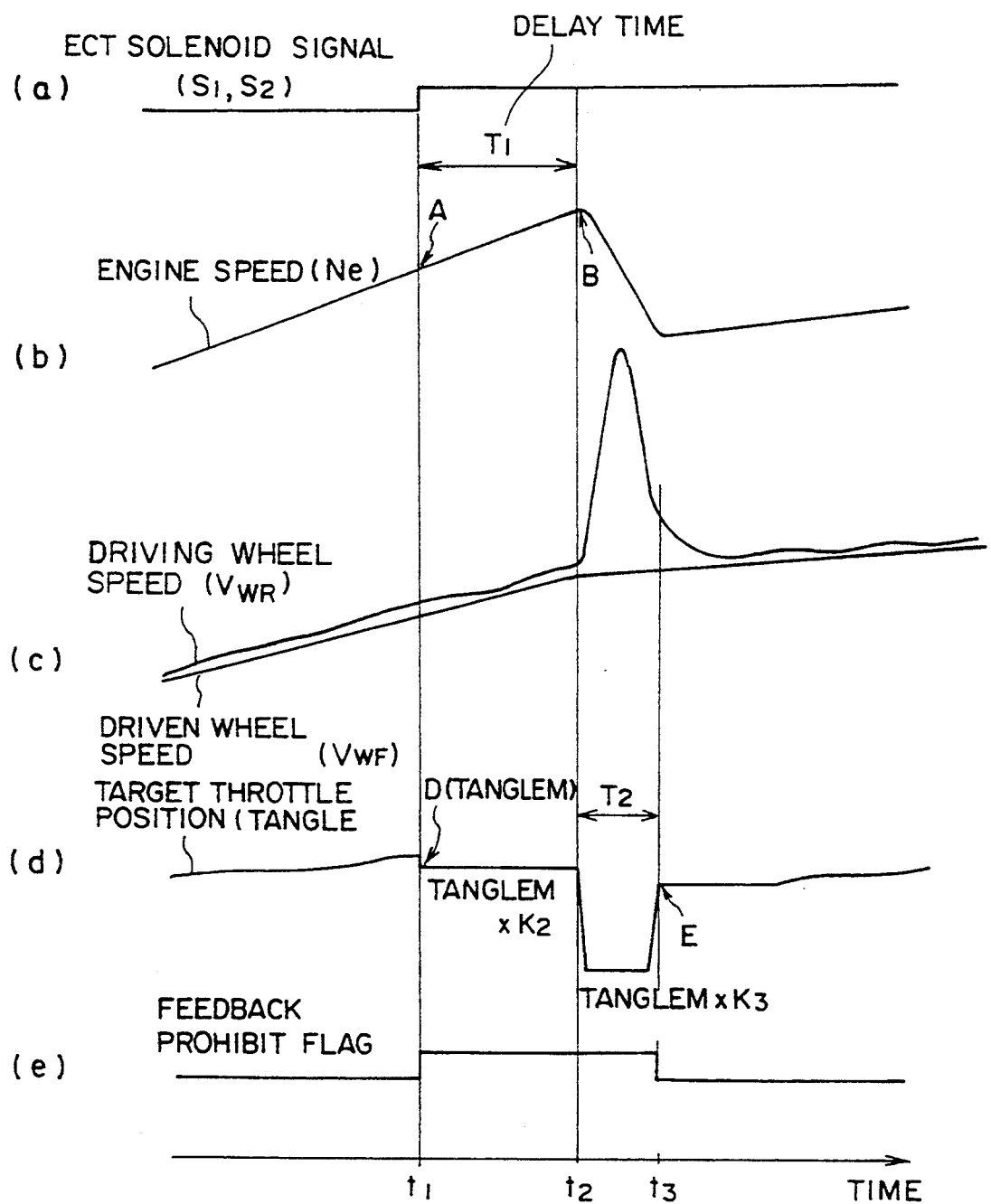
FIG. 7 is a diagram for explaining operations of the traction control apparatus when the shift-up control routine shown in FIGS.4A and 4B is performed.

Next, a description will be given, with reference to FIGS. 4A, 4B and 7, of a shift-up control process performed when a shift-up action occurs during the traction control process. This shift-up control process is performed so as to suppress the slipping due to the shift-up of the automatic transmission 5.

Figure 4A:
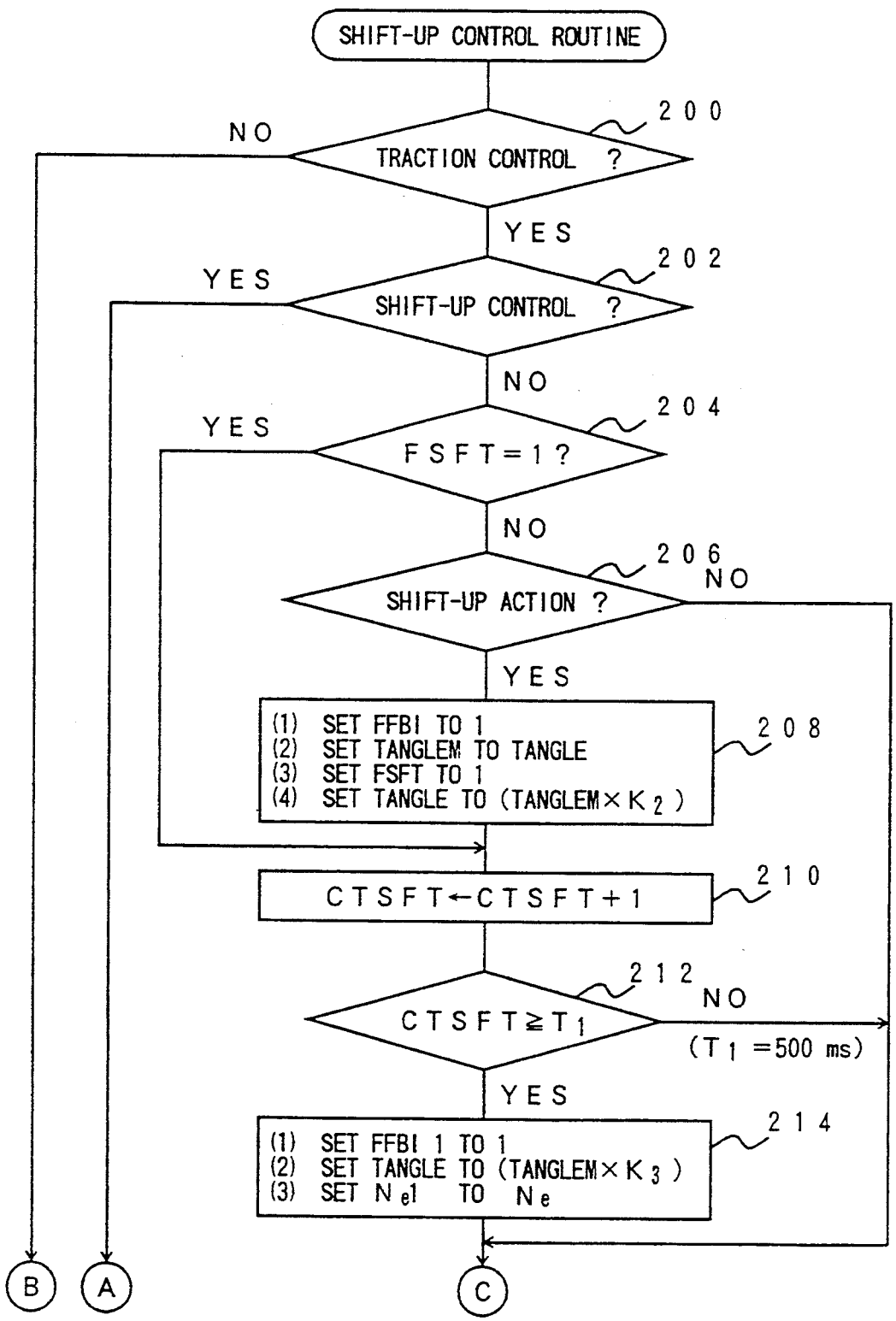
FIGS. 4A and 4B are flow charts for explaining a shift-up control routine performed in the traction control process shown in FIGS. 3A and 3B.
Figure 4B:
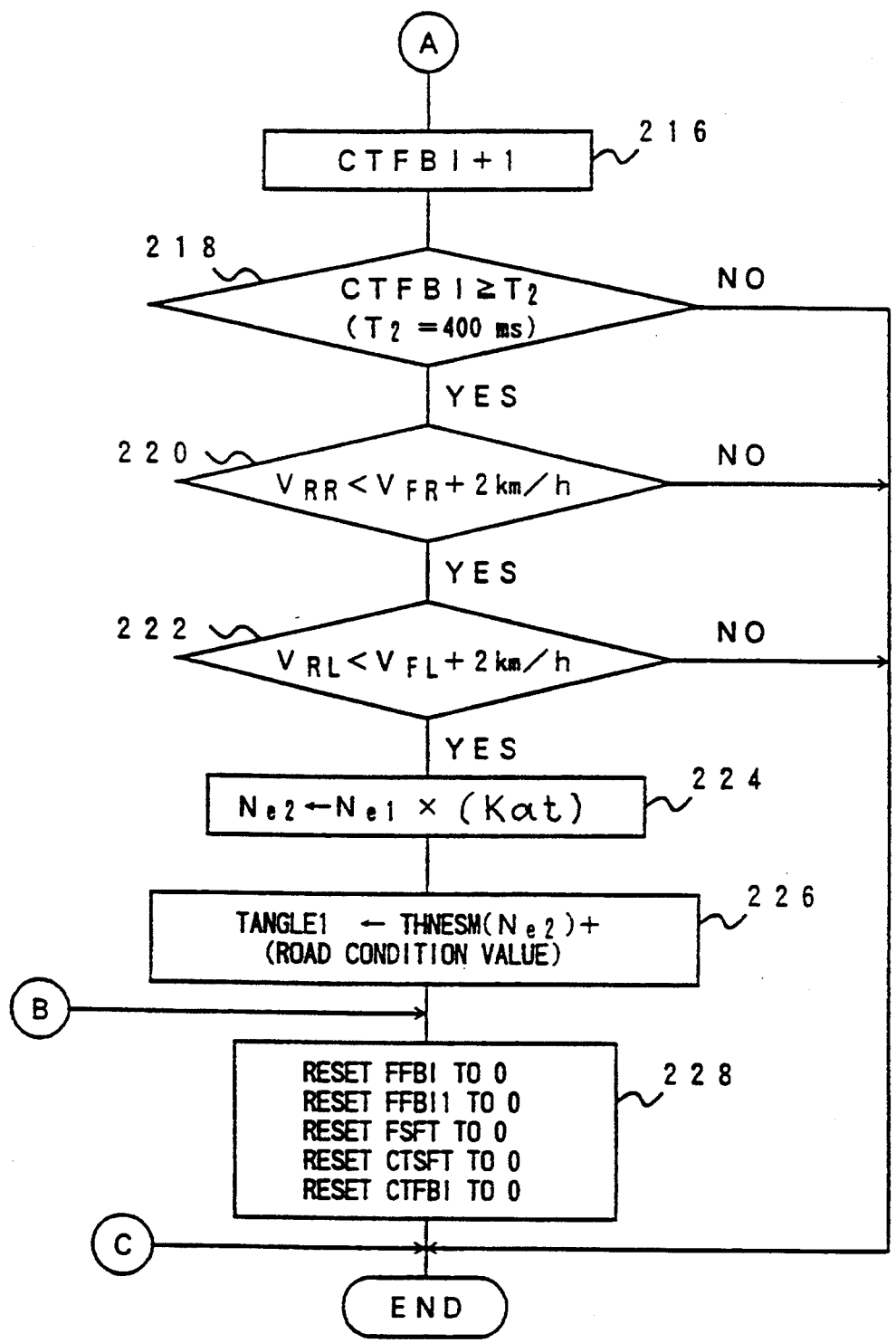

FIGS. 4A and 4B show the above described shift-up control process. Step 200 shown in FIG. 4A detects whether or not the traction control process is currently being performed. If the traction control process is not being performed, it is not necessary to perform the shift-up control process, and the next step 228 shown in FIG. 4B is performed. In step 228 the flags are reset to zero and this routine ends.

If the traction control process is currently in process, the next step 202 is performed. In step 202, it is detected whether or not the shift-up process is currently in process. More specifically, the detection of step 202 is performed by checking whether or not a shift-up in-process flag FFBI1 is equal to 1. If the flag FFBI1 is not equal to 1, an initial shift-up control procedure is performed in steps 204 to 214. If the flag FFBI1 is equal to 1, a throttle return position setting procedure is performed in steps 216 to 226.

The initial shift-up control procedure performed when the shift-up control process is not being performed will be described with reference to FIG. 4A. Step 204 detects whether or not a shift-up control delay waiting flag FSFT is equal to 1. If the flag FSFT is not equal to 1, it is judged that the shift-up control is in a delay waiting condition. The next step 206 is performed. Step 206 detects whether or not a shift-up request occurs in the ECT unit 50. The occurrence of the shift-up request is checked by detecting whether or not ECT solenoid signals (S1, S2) are supplied from the ECT unit 60. If the shift-up request does not occur in step 206, it is not necessary to perform the initial shift-up control procedure, and the process shown in FIGS. 4A and 4B ends.

If the shift-up request occurs in step 206, the next step 208 is performed. In step 208, the following four items are performed. (1) the feedback prohibition flag FFBI is set to 1, so that the feedback control of the sub throttle valve 16 is stopped. (2) a memory value TANGLEM is set to a target throttle position TANGLE of the sub throttle valve 16 at the time of a shift-up action being instructed by the ECT unit 60 (when a solenoid of the ECT unit 60 is instructed to take a shift-up action but the actual shift-up action of the automatic transmission 5 has not yet occurred due to the oil pressure delay). This memory value TANGLEM is indicated by an arrow D in FIG. 7. (3) the shift-up control delay waiting flag FSFT is set to 1. (4) the target throttle position TANGLE of the sub throttle valve 16 is set to a value of TANGLEM×K2, so that the sub throttle valve 16 is slightly more closed so as to lower the peak of the slipping amount due to shifting.

By the item (1) mentioned above, the traction control process shown in FIGS. 3A and 3B with respect to the sub throttle valve 16 is prohibited, and the sub throttle valve 16 is controlled in accordance with the shift-up control process shown in FIGS. 4A and 4B. The memory value TANGLEM obtained in the item (2) is used for the calculations in the item (4) and the step 214 mentioned below. The flag FSFT being set to 1 in the item (3) is used for the detection in step 204 mentioned above. By the item (4), the sub throttle valve 16 is set to a prescribed target position and the engine torque is reduced. The prescribed target position of the sub throttle valve 16 is determined according to the formula: TANGLE=TANGLEM×K2. The coefficient K2 in this embodiment is preset to 85%.

Generally, there is a delay time until the shift-up action of the automatic transmission 5 actually occurs. This delay time is indicated by "T1" in FIG. 7. The automatic transmission 5 does not take the shift-up action immediately when a shift-up instruction is received. During the delay time T1, that is, from the time t1 of instructing a shift-up in the ECT unit 60 (the ECT solenoid signals S1, S2) to the time t2 of starting connection to a shifted position of the automatic transmission as shown in FIG. 7, the shift-up action continues. Steps 204, 210 and 212 are provided to maintain the condition of the traction control apparatus being set in step 208 until the delay time T1 has elapsed. The delay time T1 in this embodiment is preset to 500 msec.

After step 208 is performed, step 210 increments a delay waiting count CTSFT (CTSFT=CTSFT+1), and step 212 detected whether or not the count CTSFT is greater than the delay time T1. If CTSFT<T1, the shift-up control process ends. If CTSFT≧T1, step 214 is performed.

When the delay time T1 has elapsed in step 212, step 214 performs the following three items. In step 214, (1) the shift-up in-process flag FFBI1 is set to 1. (2) the target throttle position TANGLE of the sub throttle valve 16 is set to a value of TANGLEM×K3. (3) a memory value Ne1 of the engine speed is set to the engine speed Ne at the time t2 in FIG. 7. The memory value Ne1 of the engine speed is indicated by "B" in FIG. 7.

By the item (1) mentioned above, it is detected whether or not the initial shift-up control procedure has been performed in steps 204 to 214. As described above, if the flag FFBI1 is equal to 1 in step 202, the throttle return position setting procedure in steps 216 to 226 is performed. By the item (2) mentioned above, the sub throttle valve 16 is more closed so that the engine torque and the engine speed are lowered. The target throttle position TANGLE of the sub throttle valve 16 is determined according to the formula: TANGLE=-TANGLE×K3. The coefficient K3 in this embodiment is preset to 20%, for example. See FIG. 7 (d).

The memory value Ne1 of the engine speed stored in the item (3) of step 214 is used to determine a return position of the sub throttle valve 16 in the throttle return position setting procedure in steps 216 to 226, which will be described below. According to the present invention, the return position of the sub throttle valve 16 is determined based on this engine speed Ne1 at the time t2 when the shift-up action actually occurs.

With reference to FIG. 4B, the throttle return position setting procedure performed when the shift-up control process is in process will be described. When the flag FFBI1 is equal to 1 in step 202, the next step 216 shown in FIG. 4B is performed. In step 216, a count CTFBI is incremented (CTFBI=CTFBI+1). This count CTFBI is incremented each time the throttle return position setting procedure is performed. Step 218 detects whether or not the count CTFBI is greater than a prescribed time. This prescribed time is preset to 400 msec in this embodiment. Steps 220 to 228 are not performed until the count CTFBI has reached the prescribed time, and the time period T2 from the time t2 to the time t3 indicated in FIG. 7, during which the target throttle position having the relatively low value of (TANGLEM×K3) is maintained, continues for at least 400 msec. It is therefore possible to reliably suppress the slipping due to the shifting of the automatic transmission.

Steps 220 and 222 shown in FIG. 4B respectively detect whether or not a speed difference (Vrr–Vfr) between the right-hand driving and driven wheel speeds is smaller than 2 Km/h, and whether or not a speed difference (Vrl–Vfl) between the left-hand driving and driven wheel speeds is smaller than 2 Km/h. Only when both the speed differences are smaller than 2 Km/h in steps 220 and 222, a return position TANGLE1 of the sub throttle valve 16 is determined in steps 224 and 226. If either of the required conditions described above is not satisfied, the shift-up control process ends.

After the required conditions in steps 216 to 222 are satisfied, step 224 determines an engine speed Ne2 after the shift-up action according to the formula: Ne2=-Ne1×Kat (Kat: gear ratio). The engine speed Ne2 after the shift-up action of the automatic transmission occurs is determined based on the engine speed Ne1 obtained in step 214 and the gear ratio Kat. The gear ratio Kat in this formula is a ratio of a gear position value of the automatic transmission 5 after the shift-up action to a gear position value before the shift-up action.

Figure 8:
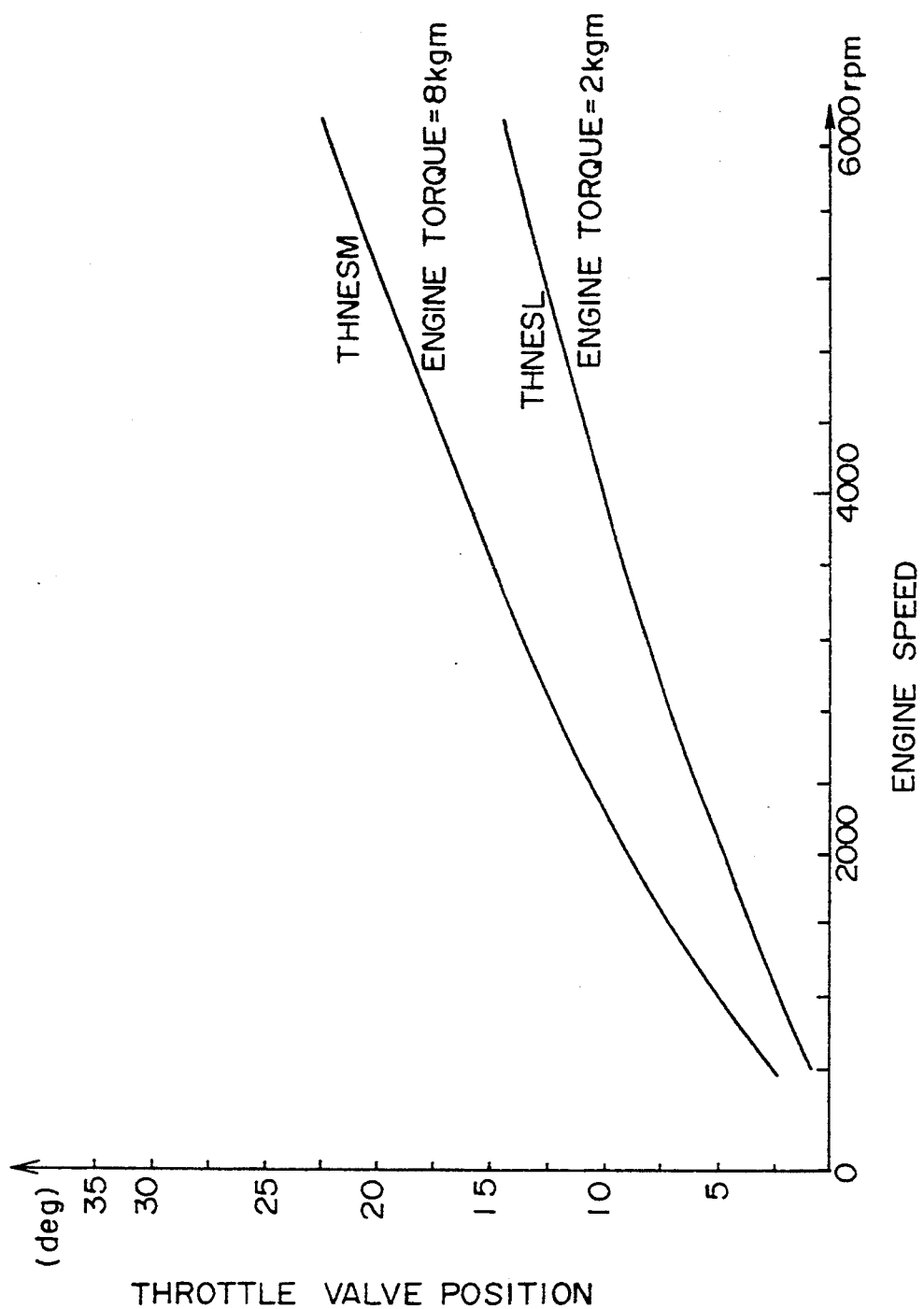
FIG. 8 is a diagram showing a characteristic map indicating a relationship between the engine speed and the throttle valve position when the engine torque is constant.

After the engine speed Ne2 after the shift-up action is determined in step 224, step 226 determines the return position TANGLE1 of the sub throttle valve 16 based on a throttle position value THNESM obtained from a characteristic map shown in FIG. 8 and based on the road condition value obtained by learning. The return position TANGLE1 determined in step 226 is indicated by an arrow E in FIG. 7.

From the characteristic map shown in FIG. 8, the throttle position THNESM corresponding to the engine speed Ne2 (after the shift-up action) in step 224 is obtained. This characteristic map, as shown in FIG. 8, indicates a relationship between the engine speed and the throttle valve position when the engine torque is constant. The return position TANGLE1 in step 226 is determined by adding the road condition value, obtained by learning, to the thus obtained throttle position THNESM (Ne2). Therefore, it is possible to obtain a return position of the sub throttle valve 16 corresponding to an engine torque which is substantially the same as the engine torque before the shift-up action occurred. Hence, by setting the sub throttle valve 16 to the return position TANGLE1 thus determined in step 226, the torque fluctuation after the shift-up action can be minimized. In addition, due to the use of the return position TANGLE1 in which the road condition value is incorporated, the engine torque suitable for the road condition can be produced.

After the return position TANGLE1 is determined in step 226, the sub throttle valve 16 is set to the return position TANGLE1 by the TRC unit 50. Then, all the flags and the counts are reset to zero in step 228, and the shift-up control process ends.

In the throttle return position setting procedure described above, the return position TANGLE1 of the sub throttle valve 16 after the shift-up action is determined based on the engine speed Ne2 when the shift-up action actually occurred. This engine speed Ne2 when the shift-up action actually occurred is indicated by the arrow "B" in FIG. 7, and it is the engine speed which is not influenced by the external conditions such as a fuel cut condition and an ignition timing retard condition. In the above described embodiment, the return position TANGLE1 after the shift-up action is determined based on the engine speed Ne2, and therefore it is possible to set the sub throttle valve 16 to the optimal position, thus allowing the engine torque after the shift-up action to have the optimal value.

Next, a description will be given, with reference to FIGS. 5 and 6, of a road condition learning process for obtaining the road condition value by learning. This road condition value, as described above, is used to obtain the return position TANGLE1 of the sub throttle valve 16 in step 226 mentioned above.

Figure 5:
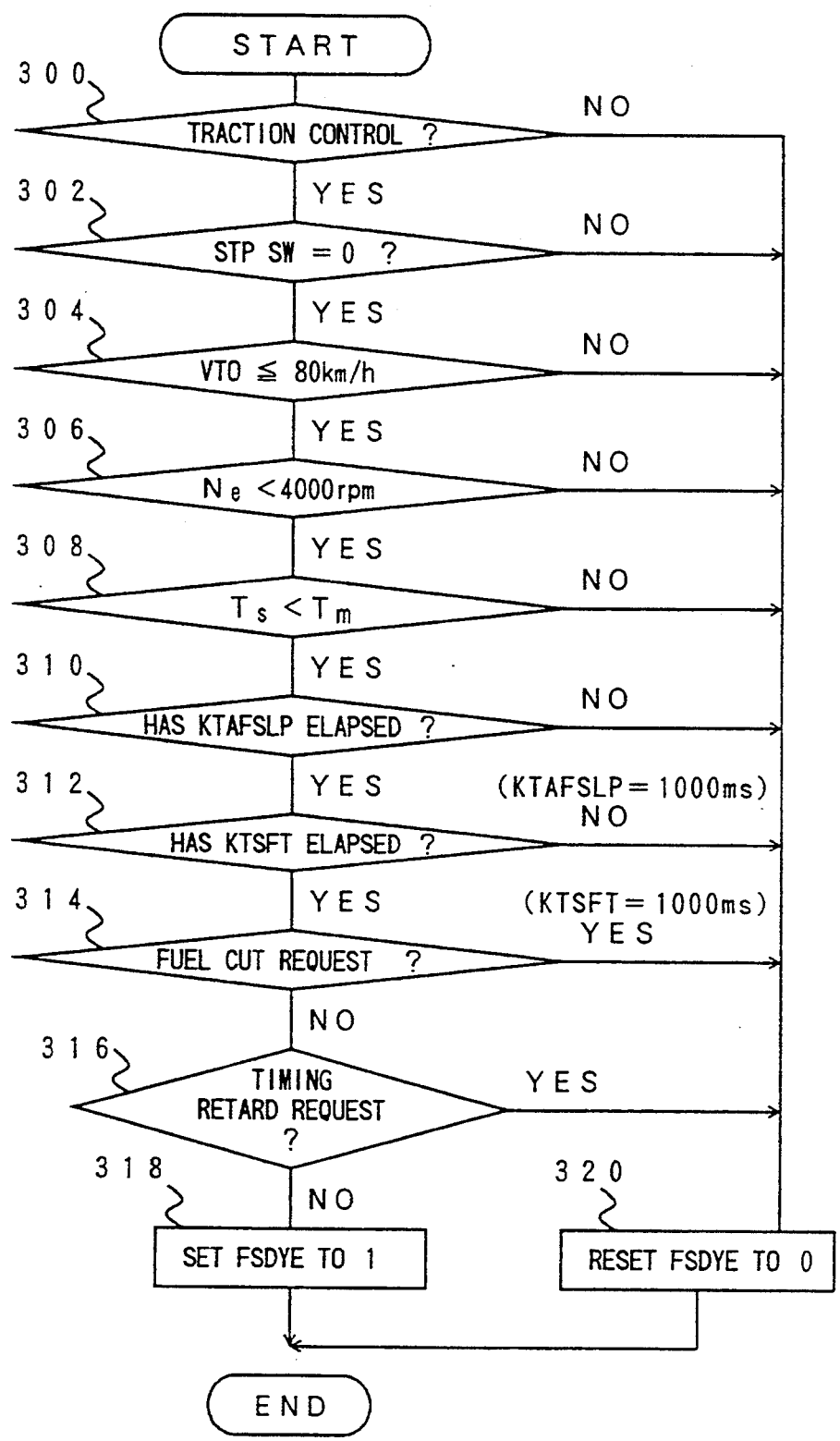
FIG. 5 is a flow chart for explaining a learning enable flag setting routine.

FIG. 5 shows a learning enable flag setting routine to detect whether or not a condition required for performing the road condition learning process is satisfied. Step 300 shown in FIG. 5 detects whether or not the traction control process is currently in process. If the traction control process is not in process, it is not necessary to perform the road condition learning process. The next step 320 is performed. In step 320 the learning enable flag is set to 0, and this process ends.

If the traction control process is in process in step 300, step 302 is performed. Step 302 detects whether or not a brake pedal of the vehicle 1 is depressed by checking whether or not a stop switch STP SW is equal to 0. If the stop switch STP SW is set to 1, the brake pedal is depressed. When the brake pedal is depressed, it is impossible to correctly perform the road condition learning process. Thus, the next step 320 is performed as described above.

If the stop switch STP SW is equal to 0 in step 302, step 304 is performed. Step 304 detects whether or not the vehicle speed VTO is smaller than a prescribed reference speed (e.g., 80 Km/h). Step 306 detects whether or not the engine speed Ne is smaller than a prescribed reference speed (e.g., 4000 r.p.m.). Step 308 detects whether or not the position Ts of the sub throttle valve 16 is smaller than the position Tm of the main throttle valve 14. If the answer to any of steps 304 to 308 is negative, it is impossible to correctly perform the road condition learning process, and the next step 320 is performed, as described above.

Step 310 detects a prescribed waiting time period KTAFSLP has elapsed since the traction control process was started. Step 312 detects whether or not a prescribed waiting time period KTSFT has elapsed since the shift-up action occurred. When the traction control process has just been started, or when the shift-up action has just occurred, the engine is not in a stable operating condition. Thus, if the answer to any of the steps 310 and 312, the next step 320 is performed, as described above. In this embodiment, both the waiting time periods KTAFSLP and KTSFT are preset to 1000 msec.

Step 314 detects whether or not a fuel cut request is currently made. Step 316 detects whether or not an ignition timing retard request is currently made. When the vehicle 1 is in a fuel cut control condition or in an ignition timing retard control condition, it is impossible to correctly perform the road condition learning process. Thus, if the answer to any of the steps 314 and 316 is affirmative, step 320 is performed as described above.

When all the answers to the steps 300 to 312 are affirmative and both the answers to the steps 314 and 316 are negative, step 318 sets the learning enable flag FSDYE to 1, and this road condition learning process ends.

Figure 6:
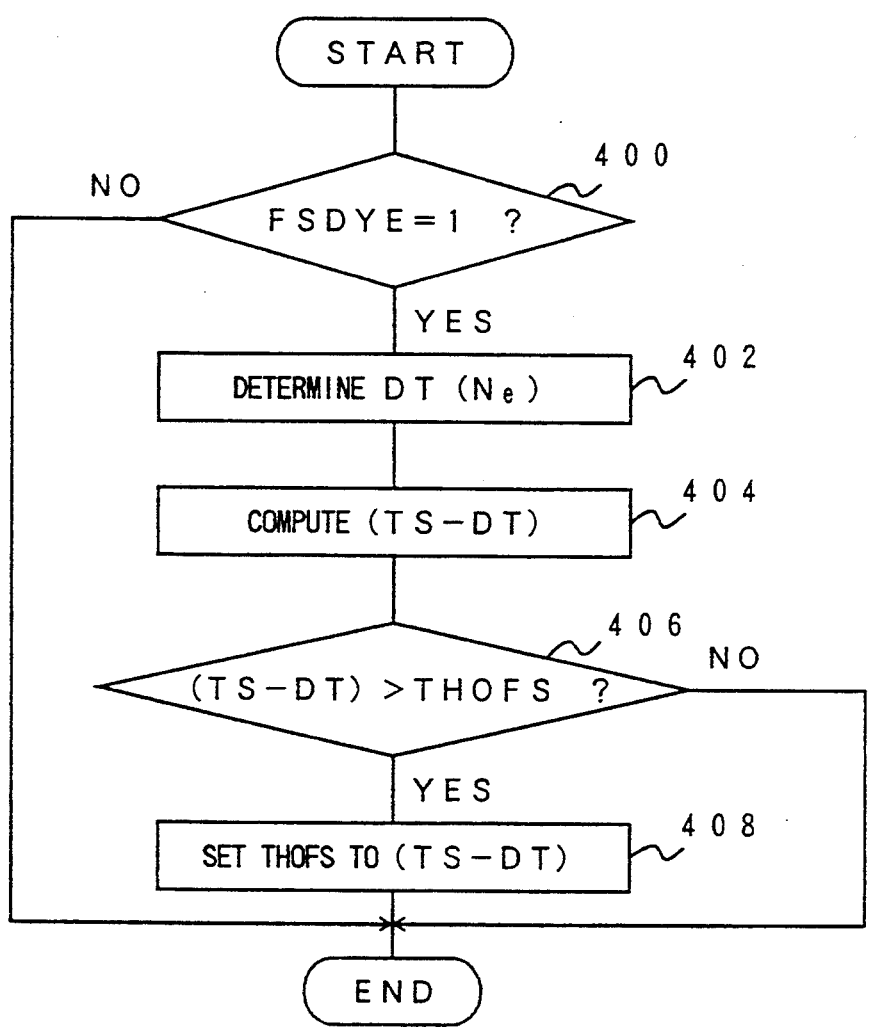
FIG. 6 is a flow chart for explaining a road condition value setting routine to obtain a road condition value by learning.

FIG. 6 shows a road condition value setting routine performed to determine the road condition value THOFS by learning. This road condition value is used to determine the return position TANGLE1 of the sub throttle valve 16 in step 226. Step 400 shown in FIG. 6 detects whether or not the learning enable flag FSDYE is equal to 1. This learning enable flag FSDYE is set to 1 in step 318 or set to 0 in step 320. If FSDYE=1 in step 400, the road condition value setting can be performed. The next step 402 is performed. If FSDYE=0 in step 400, the road condition value setting cannot be performed. The road condition value setting process ends without performing the steps 402 to 408.

In step 402, an initial target position T(Ne) of the sub throttle valve 16 is determined according to a characteristic map indicating a relationship between the engine speed Ne and the throttle position T when the engine torque is constant, based on the current engine speed Ne. This characteristic map is predetermined according to the gradient of the standard constant-torque chart. The thus determined initial target position T(Ne) is corrected based on the gear ratio Kat, and this corrected initial target position is indicated as DT(Ne). In step 402, the corrected initial target position DT(Ne) is obtained. The initial target position T(Ne) of the sub throttle valve 16 corresponds to a prescribed road surface factor. In this embodiment, this road surface factor is preset to 0.6, and the characteristic map shown in FIG. 8 is used. In this embodiment, data of the characteristic map with respect to the first gear position of the automatic transmission is stored. The initial target positions T(Ne) with respect to the second and third gear positions are obtained by multiplying the initial target position with respect to the first gear position (based on the stored data of the characteristic map) by correction factors KAT2 and KAT3 (1<KAT2<KAT3), respectively.

Step 404 computes the difference (Ts-DT) between the sub throttle valve position Ts and the initial target position DT obtained in step 402. Step 406 detects whether or not the difference (Ts-DT) obtained in step 404 is greater than the previous value of the road condition value THOFS. In addition, in step 406 it is detected whether or not the difference (Ts-DT) has an extraordinary value when compared with the previous value of the road condition value THOFS. In this embodiment, if the difference (Ts-DT) has no extraordinary value in step 406, step 408 sets the road condition value THOFS to the difference (Ts-DT) as the current value of THOFS. In other embodiments, the road condition value THOFS is set, in step 408, to the difference (Ts-DT) when the difference (Ts-DT) is greater than the previous value of THOFS.

Next, a description will be given, with reference to FIG. 9, of the shift-up control value setting routine. The shift-up control value dTs obtained in this routine is used to determine the target position Ts of the sub throttle valve 16 in step 142. Step 500 shown in FIG. 9 computes the slipping amount dV=Vs-Vd and a changing rate thereof dG. The value of the changing rate dG is determined based on the previous and current values of each of the vehicle speed Vr and the driving wheel speed Vd, according to the formula:

$$dG = (dVr - dVd) = [Vr(n) - Vr(n-1)] - [Vd(n) - Vd(n-1)].$$

Figure 9:
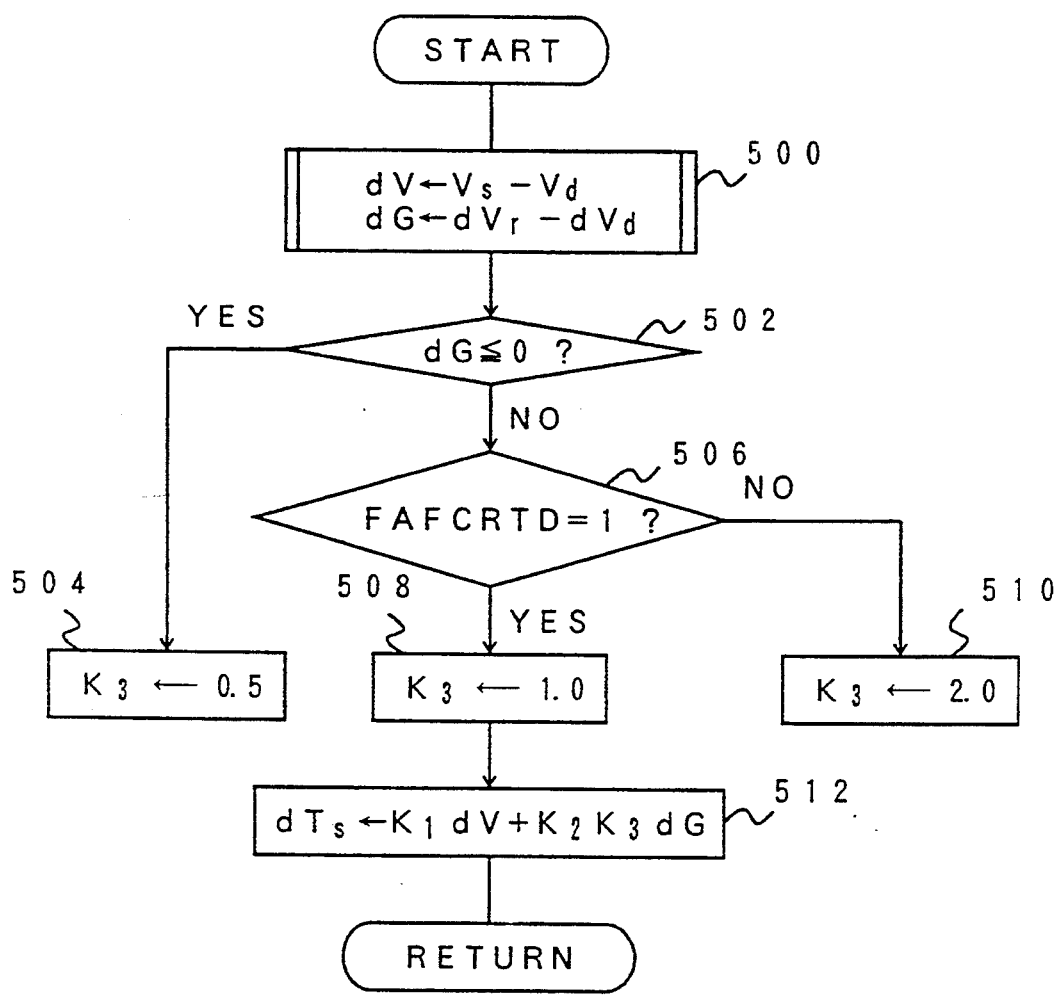
FIG. 9 is a flow chart for explaining a shift-up control value setting routine performed within the main routine shown in FIGS. 3A and 3B.

Step 502 shown in FIG. 9 detects whether or not the value of the changing rate dG, obtained in step 500, is smaller than zero. In this embodiment, if the value of dG is smaller than zero (negative) in step 502, step 504 sets the coefficient K3 to 0.5. If the value of dG is equal to or greater than zero (zero or position) in step 502, the next step 506 is performed.

Figure 10:
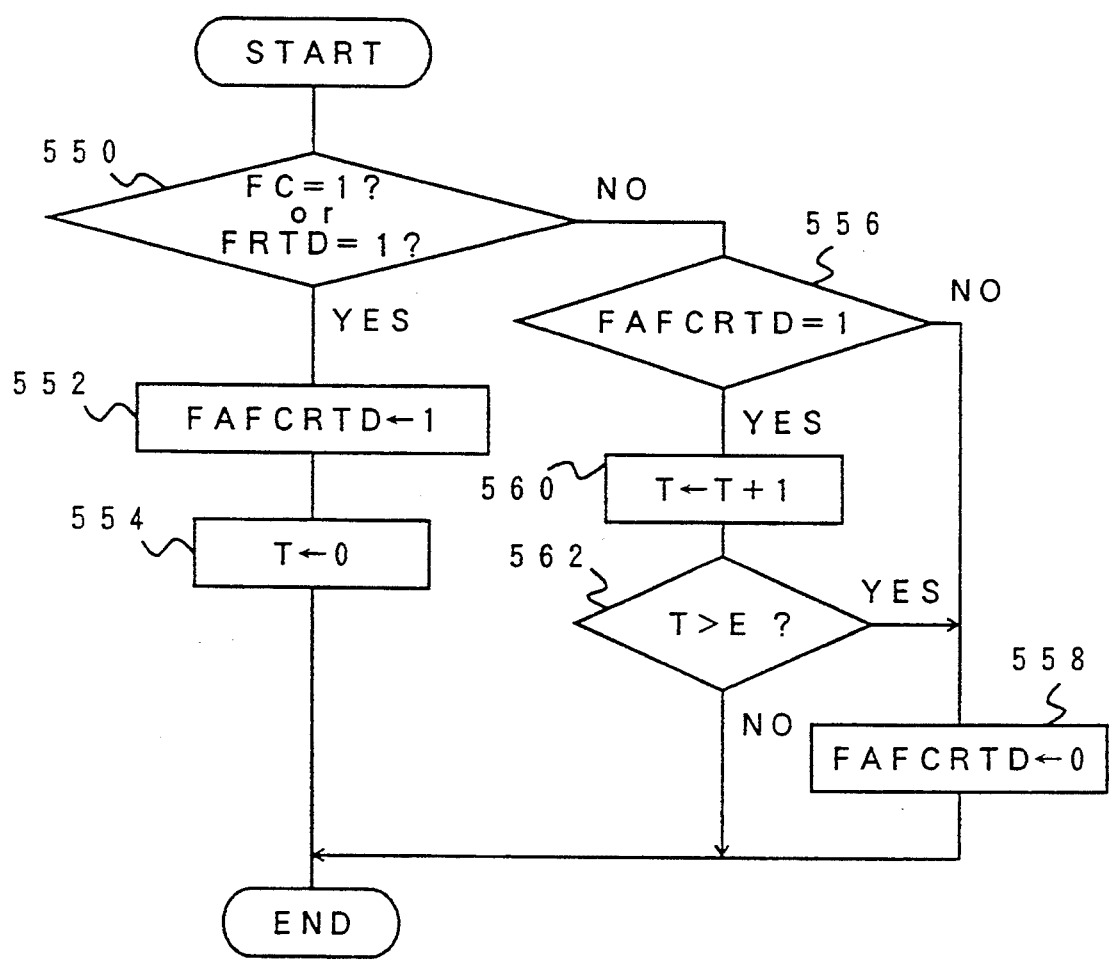
FIG. 10 is a flow chart for explaining a flag setting routine to set a flag FFCRTDS for use in the shift-up control value setting routine shown in FIG. 9.

When the value of dG is not smaller than zero, step 506 detects whether or not the flag FFCRTDS is equal to 1. As shown in FIG. 10, this flag FFCRTDS is set to 1 when the traction control apparatus is in a fuel cut control condition or in an ignition timing retard control condition, and the flag FFCRTDS has the value one until a prescribed time period (e.g., 102 msec) has elapsed since both the fuel cut control process and the ignition timing retard control process are completed.

When the flag FFCRTDS is equal to 1 in step 506, step 508 sets the coefficient K3 to 1.0. When the flag FFCRTDS is equal to 0 in step 506, step 510 sets the coefficient K3 to 2.0. Thus, when no considerable influences of the fuel cut control or the ignition timing retard control exist, the coefficient K3 has a relatively great value. Step 512 sets the shift-up control value dTs by using the coefficients K1, K2 and K3, the slipping amount dV, and the changing rate dG obtained in the preceding steps. More specifically, in step 512, the shift-up control value dTs is determined according to the formula: dTs=K1 dV+K2 K3 dG. The coefficients K1 and K2 are preset according to the type of the vehicle.

FIG. 10 shows the flag setting routine to set the flag FFCRTDS for use in the shift-up control value setting routine shown in FIG. 9. This flag setting routine is periodically performed by the TRC unit 50 at a prescribed time interval. As described above, in the flag setting routine shown in FIG. 10, the flag FFCRTDS is set to 1 when the traction control apparatus is in a fuel cut control condition or in an ignition timing retard control condition, and the flag FFCRTDS has the value one until a prescribed time period E (e.g., 102 msec) has elapsed since both the fuel cut control process and the ignition timing retard control process are completed. The flag FFCRTDS is reset to 0 after the prescribed time period E has elapsed.

In the flag setting routine shown in FIG. 10, (1) the flag FC is set to 1 when the fuel cut control is in process, (2) the flag FRTD is set to 1 when the ignition timing retard control is in process, and (3) a time count T is incremented in step 560 and it is detected whether or not the time count T is greater than the time period E in step 562.

Figure 11:
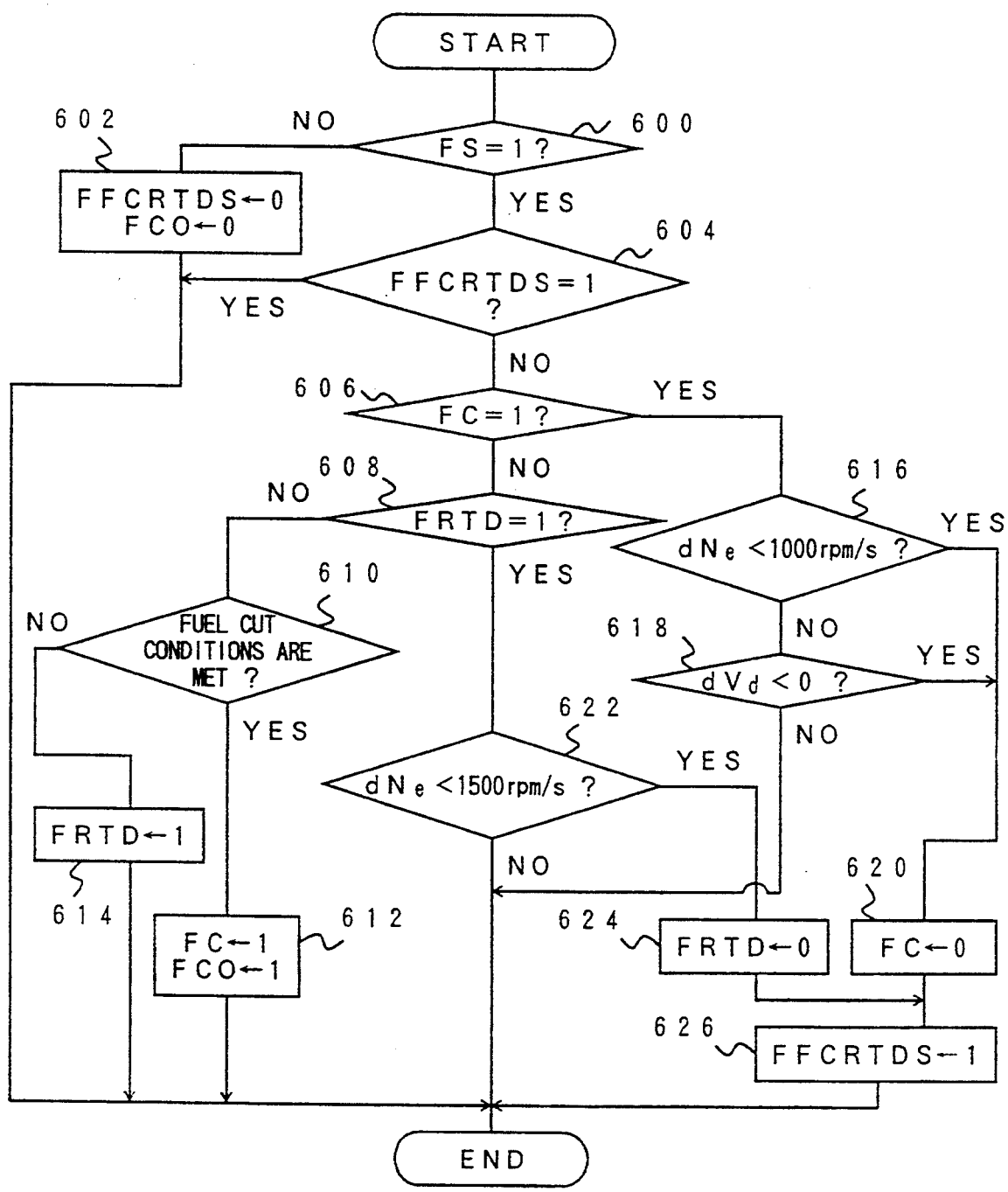
FIG. 11 is a flow chart for explaining an initial fuel cut control and ignition timing retard control routine.

FIG. 11 shows an initial fuel cut control and ignition timing retard control routine. This routine is separate from the main routine of the traction control process shown in FIGS. 3A and 3B, and is periodically performed by the TRC unit 50 at a prescribed time interval. The initial fuel cut control and ignition timing retard control routine is once performed whenever the traction control process has started, in order to reduce the driving wheel speed by the fuel cut control or the ignition timing retard control. In the routine shown in FIG. 11, the fuel cut execution flag FC and the ignition timing retard execution flag FRTD are set. Based on the conditions of the flags, the actual operations of the fuel cut control and the ignition timing retard control are performed by the EFI unit 30.

Step 600 shown in FIG. 11 detects whether or not the flag FS is equal to 1. This flag FS indicating the on/off condition of the traction control process is set to 1 in step 114 shown in FIG. 3A. If the flag FS is not equal to 1 in step 600, step 602 resets both flags FFCRTDS and FCO to zero, and this routine ends. The flag FFCRTDS is set to 1 when either the initial fuel cut control process or the initial ignition timing retard control process has been performed and completed. Otherwise the flag FFCRTDS is set to 0. The flag FCO is set to 1 when the initial fuel cut control process has been performed. Otherwise the flag FCO is set to 0.

If the flag FS is equal to 1 in step 600, the traction control process is being performed. The next step 604 is performed. Step 604 detects whether or not the flag FFCRTDS is equal to 1. If the flag FFCRTDS is equal to 1, it is judged that either the initial fuel cut control or the initial ignition timing retard control has been performed, and this routine ends. If the flag FFCRTDS is not equal to 1 in step 604, step 606 is performed.

Step 606 detects whether or not the flag FC is equal to 1, and step 608 detects whether or not the flag FRTD is equal to 1. When both flags FC and FRTD are not equal to 1, it is judged that neither the initial fuel cut control nor the initial ignition timing retard control has not been performed. Thus, either of the two processes is performed in steps 610 to 614.

In this embodiment, the initial fuel cut control is performed in preference to the initial ignition timing retard control. Step 610 detects whether or not the conditions required for starting a fuel cut control process are satisfied. The required conditions include: (1) no malfunction must occur in the sensors, and (2) the temperature of engine cooling water must be higher than a prescribed temperature. If the required conditions of the fuel cut control process are satisfied in step 610, step 612 is performed. Step 612 sets both the flags FC and FCO to 1, and the initial fuel cut control process is performed by the EFI unit 30 due to the flag FC being set to 1. If the required conditions are not satisfied in step 610, step 614 is performed. Step 614 sets the flag FRTD to 1, and the initial ignition timing retard control process is performed by the EFI unit 30 due to the flag FRTD being set to 1.

If the flag FC is not equal to 1 in step 606, it is judged that the initial fuel cut control has not been completed. It is detected whether or not the initial fuel cut control should be stopped in steps 616 and 618. Step 616 detects whether or not the engine speed increasing rate dNe is smaller than 1000 r.p.m. per second. Step 618 detects whether or not the driving wheel speed changing rate dVd is smaller than zero. If the answer to either of steps 616 and 618 is affirmative, it is judged the initial fuel cut control should be stopped. The next step 620 is performed. Step 620 resets the flag FC to 0, so that the EFI unit 30 stops the initial fuel cut control. After the initial fuel cut control is stopped, step 626 sets the flag FFCRTDS to 1, and this routine ends.

If the flag FRTD is equal to 1 in step 608, it is judged that the initial ignition timing retard control has not been completed. The next step 622 is performed. Step 622 detects whether or not the engine speed increasing rate dNe is smaller than 1500 r.p.m. per second. If the answer to step 622 is affirmative, the next step 624 is performed. Step 624 resets the flag FRTD to zero, so that the EFI unit 30 stops the initial ignition timing retard control due to the flag FRTD being set to 0. After the initial ignition timing retard control is stopped, step 626 sets the flag FFCRTDS to 1, and this routine ends.

Figure 12:
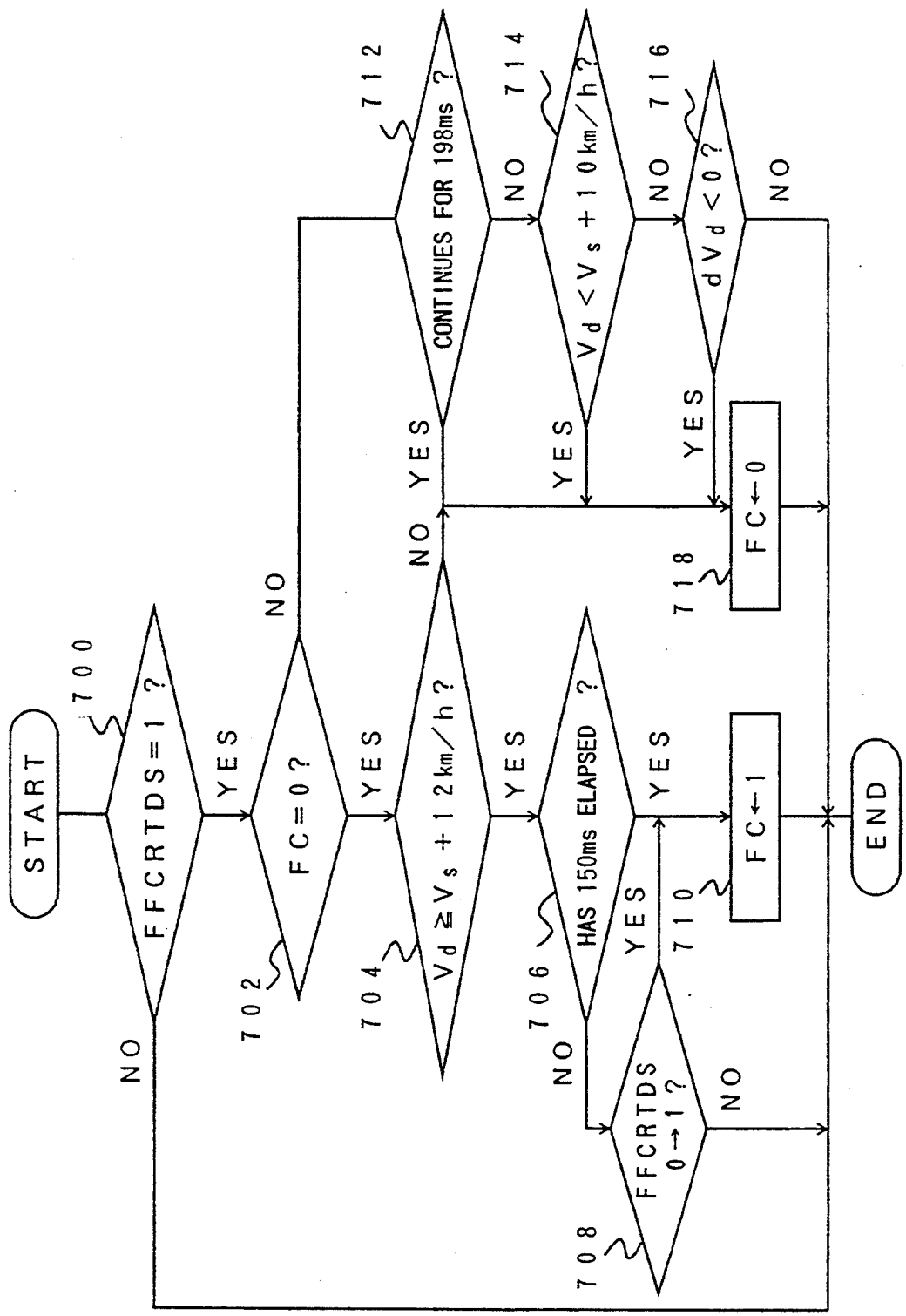
FIG. 12 is a flow chart for explaining a large-slip fuel cut control routine.

FIG. 12 shows a large-slip fuel cut control routine performed when the vehicle has a very large slip. This routine is separate from the main routine shown in FIGS. 3A and 3B and the routine shown in FIG. 11, and is periodically performed by the TRC unit 50 at a prescribed time interval.

In the routine shown in FIG. 12, steps 700 to 708 are performed to detect whether or not the conditions required for starting a large-slip fuel cut control process have been satisfied. Step 700 detects whether or not either the initial fuel cut control process or the initial ignition timing retard control process has been performed, by checking whether the flag FFCRTDS is equal to 1. Step 702 detects whether or not the fuel cut control process is currently in process, by checking whether the flag FC is equal to 0. Step 704 detects whether or not the driving wheel speed Vd is greater than the target driving wheel speed plus 12 Km/h (Vs+12 Km/h). Step 706 detects whether or not a time period of more than 150 msec has elapsed since the previous fuel cut control process was completed. If the answer to each of steps 700 to 706 is affirmative, step 710 sets the flag FC to 1, so that the EFI unit 30 starts performing the large-slip fuel cut control process.

The above step 706 is performed to avoid damaging a catalytic converter of the vehicle due to an increased exhaust emission temperature when the fuel cut control control or ignition timing retard control process is quickly or repeatedly performed. Step 708 detects whether or not the value of the flag FFCRTDS has just changed from 0 to 1. If the answer to step 708 is affirmative, it is judged that the vehicle still has a large slipping amount although the initial fuel cut control or ignition timing retard control process was completed. The above step 710 is performed, so that the large-slip fuel cut control process is again performed.

If the flag FC is equal to 1 in step 702, it is judged that the fuel cut control process is currently in process. At this time, steps 712 to 718 are performed to detect whether or not the conditions required for stopping the large-slip fuel cut control process have been satisfied. Step 712 detects whether or not the fuel cut control process continues to run for at least 198 msec. Step 714 detects whether or not the driving wheel speed Vd is smaller than the target driving wheel speed plus 10 Km/h (Vs+10 Km/h). Step 716 detects whether or not the driving wheel speed changing rate dVd is smaller than zero. If the answer to any of steps 712 to 716 is affirmative, the next step 718 is performed. Step 718 resets the flag FC to zero, so that the EFI unit 30 stops the large-slip fuel cut control process.

Figure 13:
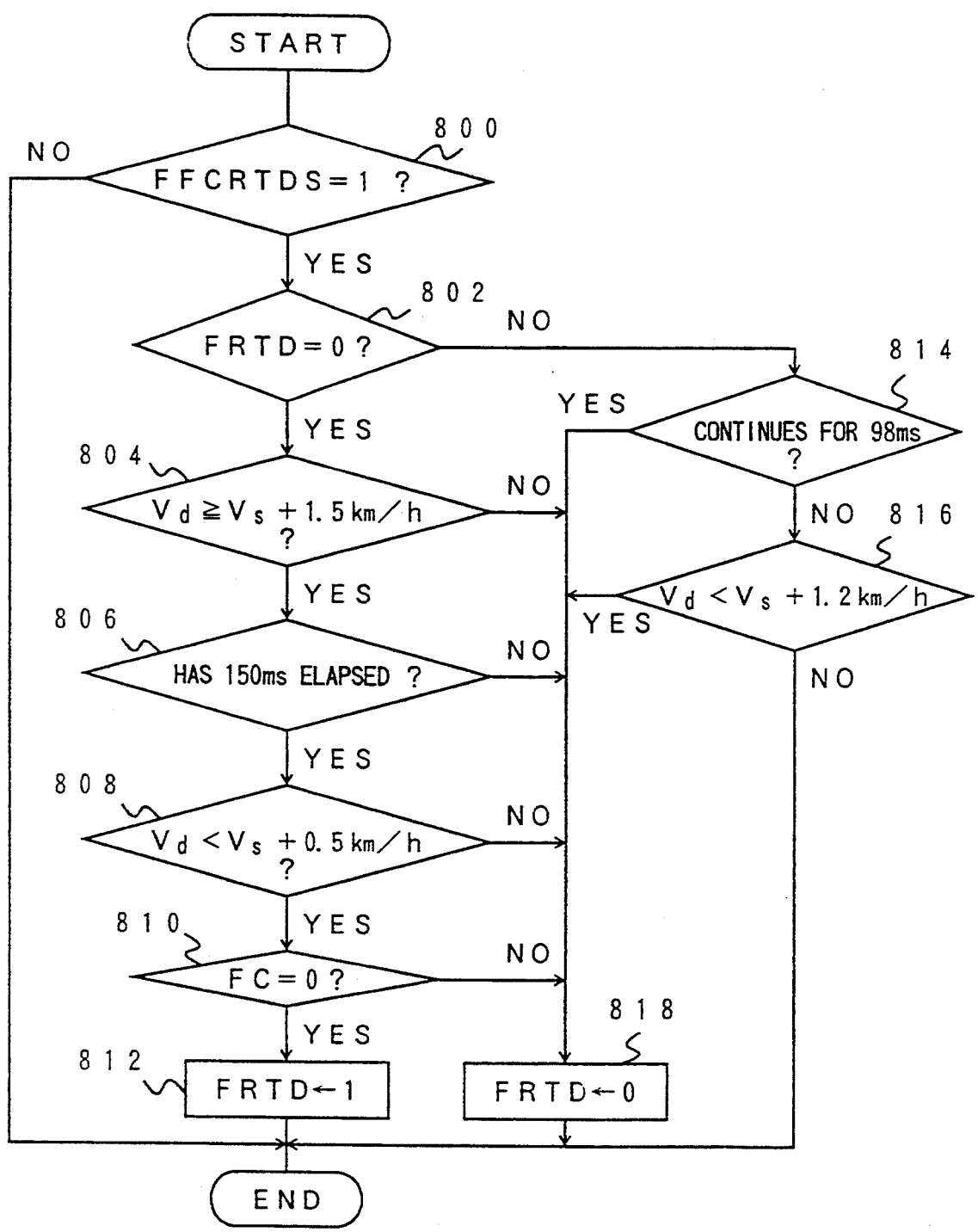
FIG. 13 is a flow chart for explaining a large-slip ignition timing retard control routine.

FIG. 13 shows a large-slip ignition timing retard control routine performed when the vehicle has a very large slip. This routine is separate from the main routine shown in FIGS. 3A and 3B, and is periodically performed by the TRC unit 50 at a prescribed time interval.

In the routine shown in FIG. 13, steps 800 to 810 are performed to detect whether or not the conditions required for starting a large-slip ignition timing retard control process have been satisfied.

Step 800 shown in FIG. 13 detects whether or not the initial fuel cut control process or the initial ignition timing retard control process has been completed, by checking whether the flag FFCRTDS is equal to 1. Step 802 detects whether or not the ignition timing retard control process is currently in process, by checking whether the flag FRTD is equal to 0. Step 804 detects whether or not the driving wheel speed Vd is greater than the target driving wheel speed plus 1.5 Km/h (Vs+1.5 Km/h). Step 806 detects whether or not a time period of at least 150 msec has elapsed since the previous ignition timing retard control process was completed. Step 808 detects whether or not the driving wheel speed Vd is reduced to the target driving wheel speed plus 0.5 Km/h (Vs+0.5 Km/h) after the previous ignition timing retard control process was completed. Step 810 detects whether or not the flag FC is equal to 0 (the fuel cut control process must currently be not in process). If all the answers to steps 800 to 810 are affirmative, the next step 812 is performed. Step 812 sets the flag FRTD to 1, so that the EFI unit 30 starts performing the large-slip ignition timing control process. If the answer to any of steps 800 to 810 is negative, no large-slip ignition timing retard control process is not performed.

If the answer to step 808 is negative, it is judged that the process to adjust the position of the sub throttle valve 16 is currently in process. Thus, the ignition timing retard control process is not performed to wait for the sub throttle valve position adjusting process mentioned above to have the effect. If the answer to step 810 is negative, it is judged that the fuel cut control process is currently in process. Thus the ignition timing retard control process is not performed to wait for the fuel cut control process to have the effect. If all the answers to steps 800 to 810 are affirmative, step 812 is performed. Step 812 sets the flag FRTD to 1, so that the EFI unit 30 starts performing the large-slip ignition timing retard process.

If the flag FRTD is equal to 1 in step 802, it is judged that the ignition timing retard control process is being performed. At this time, steps 814 and 816 are performed to detect whether or not the conditions required for stopping the large-slip ignition timing retard control process have been satisfied. Step 814 detects whether or not the ignition timing retard control process continues to run for at least 96 msec. Step 816 detects whether or not the driving wheel speed Vd is smaller than the target driving wheel speed plus 1.2 Km/h (Vs+1.2 Km/h). If the answer to either of steps 814 and 816 is affirmative, step 818 is performed. Step 818 resets the flag FRTD to zero, so that the EFI unit 30 stops the large-slip ignition timing retard control process.

The above step 814 is performed to avoid making the exhaust emission temperature too high when the ignition timing retard control process is quickly or repeatedly performed.

As described in the foregoing, according to the present invention, it is possible to reliably obtain an appropriate return position of a throttle valve so that the traction control process at the end of the shifting process is performed without making the vehicle inconsistent with the road condition or the engine operating condition. The traction control apparatus of the present invention is advantageous in that the optimal return torque of the engine can be produced, in comparison with the conventional apparatus wherein the return position of the throttle valve, which produces the return engine torque, is determined based on the throttle valve position before the shifting has occurred.

Further, the present invention is not limited to the above described embodiment, and variations and modifications may be made without departing from the scope of the present invention. For example, in the above described embodiment, the traction control apparatus of the present invention is applied to a gasoline engine vehicle. However, the present invention is applicable to diesel engine vehicles using diesel injection control by making use of the known linkless throttle control method, or by making use of the known learning process to obtain an offset from a prescribed constant-torque injection map.

What is claimed is:

1. A traction control apparatus for an automotive vehicle equipped with an automatic transmission including a transmission control unit, an engine including a first throttle valve, and driving wheels for driving the vehicle, the apparatus comprising:
   first sensing means for outputting a shift signal indicating a shifting condition of the automatic transmission;
   second sensing means for outputting an engine speed signal indicating the speed of the engine;
   a plurality of driven wheel speed sensors, each driven wheel speed sensor outputting a driven wheel speed signal indicating the speed of a respective driven wheel;
   a plurality of driving wheel speed sensors, each driving wheel speed sensor outputting a driving wheel speed signal indicating a speed of a respective driving wheel;
   target wheel speed setting means for setting a target speed of the driving wheels;
   traction control means for carrying out a feedback control process to control the slipping of the driving wheels of the vehicle by adjusting an engine torque, when the vehicle is operating under a prescribed operating condition, based on the driven wheel speed signals and the driving wheel speed signals so that the driving wheel speeds approach the target driving wheel speed;
   return torque setting means for determining a return position of the first throttle valve, to which the first throttle valve is to be set when the shifting process is completed, based on the engine speed signal output by the second sensing means when the shifting process is begun and a change in a gear ratio of the automatic transmission corresponding to the shifting request and for setting the position of the first throttle valve to the return position when the shifting process has been completed; and
   traction control inhibiting means for stopping the performance of the feedback control process whenever a shift signal from the first sensing means indicates that a shifting request has occurred in the automatic transmission and for resuming performance of the feedback control process after the position of the first throttle valve has been set to the return position.

2. A traction control apparatus according to claim 1, further including means for determining a slipping amount of the driving wheels, wherein, during the performance of the feedback control process, the traction control means sets a position of the first throttle valve to adjust the engine torque based on the slipping amount determined by the means for determining a slipping amount of the driving wheels.

3. A traction control apparatus according to claim 1, wherein the return torque setting means determines the return position of the first throttle valve based on the engine speed sensed by the second sensing means after a first predetermined time has elapsed since the shifting request occurred in the transmission control unit.

4. A traction control apparatus according to claim 1, wherein, when the shifting request occurs in the transmission control unit, the traction control means sets the position of the first throttle valve to a first throttle position, to decrease the engine torque, and maintains the first throttle position until the shifting process is started in the automatic transmission.

5. A traction control apparatus according to claim 1, wherein said traction control means sets the position of the first throttle valve to the return position after a second predetermined time period has elapsed since the start of the shifting process in the automatic transmission.

6. A traction control apparatus according to claim 1, wherein, when the shifting begins in the automatic transmission, the traction control means sets the position of the first throttle valve to a second throttle position to decrease the engine torque during the shifting process and wherein the traction control means maintains the first throttle valve in the second throttle position until the shifting process is completed.

7. A traction control apparatus according to claim 1, wherein the engine further includes a main throttle valve and the first throttle valve is a sub throttle valve provided in an intake passage of the engine, wherein the sub throttle valve is separate from the main throttle valve which is operated in response to a position of an accelerator pedal of the vehicle.

8. A traction control apparatus according to claim 1, wherein the return position of the first throttle valve is determined by the return torque setting means based on a throttle position value obtained from a map indicating a relationship between the engine speed and the throttle position when the engine torque is constant, the throttle position value from the map corresponding to the speed of the engine at the end of the shifting process carried out by the traction control means.

9. A traction control apparatus according to claim 8, further including means for determining a road condition value corresponding to a condition of a road on which the vehicle is travelling, wherein the return position of the first throttle valve is determined by adding the road condition value to the throttle position value obtained from the map.

10. A traction control apparatus according to claim 8, wherein the engine speed at the end of the shifting process is obtained by multiplying the engine speed when the shifting began by the change in the gear ratio corresponding to the shifting request.

* * * * *

UNITED STATES PATENT AND TRADEMARK OFFICE
CERTIFICATE OF CORRECTION

PATENT NO. : 5,403,247

DATED : April 4, 1995

INVENTOR(S) : Yoshifumi YAGI

It is certified that error appears in the above-indentified patent and that said Letters Patent is hereby corrected as shown below:

Column 1, line 40, delete "to maintain".

Column 5, line 43, change "electronic" to --electronically--.

Column 6, line 2, insert a comma after "step" and a comma after "154".

Column 7, line 62, change "reset" to --resets--.

Column 8, line 42, change "unit 50" to --unit 60--.

Column 9, line 30, change "detected" to --detects--.

Column 10, line 36, change "after the shift-up" to --following the shift-up--.

Column 11, line 52, after "detects" insert --whether or not--.

Column 11, line 60, after "312" insert --is negative--.

Column 13, line 12, change "position" to --positive--.

Column 13, line 19, change "one" to --1--.

Column 13, line 45, change "one" to --1--.

UNITED STATES PATENT AND TRADEMARK OFFICE
CERTIFICATE OF CORRECTION

PATENT NO. : 5,403,247
DATED : April 4, 1995
INVENTOR(S) : Yoshifumi YAGI

It is certified that error appears in the above-indentified patent and that said Letters Patent is hereby corrected as shown below:

Column 14, line 30, delete "not".

Column 14, line 57, insert --that-- between "judged" and "the".

Column 15, line 34, change "control" to --process--.

Column 16, line 22, delete "not".

Column 16, line 29, change "have the effect." to --take effect.--

Column 16, line 32, change "have the effect." to --take effect.--.

Signed and Sealed this

Third Day of October, 1995

Attest:

BRUCE LEHMAN

Attesting Officer

Commissioner of Patents and Trademarks